US007371793B2

(12) United States Patent
Gong et al.

(10) Patent No.: US 7,371,793 B2
(45) Date of Patent: May 13, 2008

(54) NANOCOMPOSITE COMPRISING STABILIZATION FUNCTIONALIZED THERMOPLASTIC POLYOLEFINS

(75) Inventors: Caiguo Gong, Pearland, TX (US); Alan J. Oshinski, Friendswood, TX (US); Beverly J. Poole, Houston, TX (US); Jerry W. Ball, Conroe, TX (US); Thomas W. Sykes, Santa Fe, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 609 days.

(21) Appl. No.: 10/800,455

(22) Filed: Mar. 15, 2004

(65) Prior Publication Data

US 2005/0203235 A1 Sep. 15, 2005

(51) Int. Cl.
*C08K 9/04* (2006.01)

(52) U.S. Cl. ...................................... 524/445; 524/447

(58) Field of Classification Search ................ 524/445, 524/447, 236

See application file for complete search history.

(56) References Cited

U.S. PATENT DOCUMENTS

| | | | | |
|---|---|---|---|---|
| 2,982,756 | A | 5/1961 | Mercier et al. | 260/45.7 |
| 4,520,171 | A * | 5/1985 | Diveley et al. | 525/279 |
| 5,411,994 | A | 5/1995 | Galli et al. | |
| 5,576,372 | A | 11/1996 | Kresge et al. | 524/442 |
| 5,576,373 | A | 11/1996 | Kresge et al. | 524/445 |
| 5,665,183 | A | 9/1997 | Kresge et al. | 152/204 |
| 5,807,629 | A | 9/1998 | Elspass et al. | 428/323 |
| 5,883,173 | A | 3/1999 | Elspass et al. | 524/446 |
| 5,936,023 | A | 8/1999 | Kato et al. | 524/445 |
| 5,973,053 | A | 10/1999 | Usuki et al. | 524/445 |
| 6,001,894 | A | 12/1999 | Ottersbach et al. | |
| 6,034,164 | A | 3/2000 | Elspass et al. | 524/445 |
| 6,057,396 | A | 5/2000 | Lan et al. | |
| 6,060,549 | A | 5/2000 | Li et al. | 524/445 |
| 6,103,817 | A | 8/2000 | Usuki et al. | 524/574 |
| 6,252,020 | B1 | 6/2001 | Kuo et al. | |
| 6,410,629 | B1 * | 6/2002 | Mullins et al. | 524/351 |
| 6,451,897 | B1 * | 9/2002 | Niyogi | 524/445 |
| 2005/0014905 | A1 * | 1/2005 | Chung et al. | 525/333.7 |
| 2006/0122308 | A1 * | 6/2006 | Wermter et al. | 524/445 |
| 2007/0004842 | A1 * | 1/2007 | Tomova et al. | 524/445 |

FOREIGN PATENT DOCUMENTS

| | | |
|---|---|---|
| WO | WO 98/09995 | 3/1998 |
| WO | WO 99/07790 | 2/1999 |

OTHER PUBLICATIONS

Morlat-Therias A., et al Photooxidation of Polypropylene/ Montmorillonite Nanocomposites, Interactions with Antioxidants. Chem. Mater. 2005, 17, 1072-1078, ACS Publication, Feb. 10, 2005.*

* cited by examiner

*Primary Examiner*—Katarzyna Wyrozebski
(74) *Attorney, Agent, or Firm*—Michael S. Kerns

(57) ABSTRACT

This invention relates to nanocomposites comprising organo-clay and at least one stabilization functionalized thermoplastic polyolefin. Preferably the stabilization functionalized thermoplastic polyolefin is represented by the formula:

$$T\text{-}(R^1G)_n$$

Wherein

T represents the thermoplastic polyolefin

Each $R^1$ is a bridging group, preferably independently selected from the group consisting of $C_1$ to $C_{20}$ aliphatic; $C_1$ to $C_{20}$ aromatic; substituted $C_1$ to $C_{20}$ aliphatic; substituted $C_1$ to $C_{20}$ aromatic; $C_1$ to $C_{20}$ aliphatic ester; $C_1$ to $C_{20}$ aliphatic ether; $C_1$ to $C_{20}$ aliphatic amide; $C_1$ to $C_{20}$ aliphatic imide;

n is the number of stabilization functional/bridging groups bound to T and may be from 1-300; and G is selected from one or more of phenols, ketones, hindered amines, substituted phenols, substituted ketones, substituted hindered amines, or combinations thereof.

5 Claims, No Drawings

NANOCOMPOSITE COMPRISING STABILIZATION FUNCTIONALIZED THERMOPLASTIC POLYOLEFINS

FIELD OF THE INVENTION

This invention relates to a nanocomposite with improved thermal stability useful for molded parts of improved stiffness. The nanocomposite is typically a blend of an organoclay and at least one thermoplastic polyolefin having stabilization functionality bonded to the thermoplastic polyolefin.

BACKGROUND OF THE INVENTION

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. A common type of inorganic particle used in nanocomposites are phyllosilicates, an inorganic substance from the general class of so called "nano-clays" or "clays". Ideally, intercalation should take place in the nanocomposite, wherein the polymer inserts into the space or gallery between the clay surfaces. Ultimately, it is desirable to have exfoliation, wherein the polymer is fully dispersed with nanometer-size clay platelets. Due to the general enhancement in modulus or stiffness qualities of various polymer blends when clays are present, there is a desire to have a nanocomposite with high modulus and/or stiffness for automotive or appliance applications that maintains the modulus and/or stiffness after long term heat aging (LTHA).

WO 9809995 suggests that phenolic compounds can be used as free radical inhibitors during polymerization without deactivation of transition metal catalysts. The subject of this document purportedly includes a process for inhibiting deterioration in a polymer by adding a free radical inhibitor during or before polymerization. Additionally, inhibitor addition during or before polymerization purportedly is advantageous in that it results in good mixing and avoids processing steps such as melting formed polymer. This document does not disclose nanocomposites or use of organo-clays in combination with stabilized polymers.

U.S. Pat. No. 2,982,756 suggests method of stabilizing polymers against oxidative degradation. This document further suggests that oxidative degradation of α-olefin polymers purportedly can be prevented and the polymers stabilized by incorporating in them, in addition to the organic non-staining antioxidant, a minor amount of elemental sulfur.

U.S. Pat. No. 6,451,897 suggests a nanocomposite material comprising a smectite clay having exchangeable cations that is treated with at least one organic swelling agent, uniformly dispersed in a graft copolymer having a backbone of a porous propylene polymer material, to which is graft polymerized at least one grafting monomer capable of being polymerized by free radicals, wherein the total inorganic content of the composite material is about 0.5% to about 10% based on the total weight of the composite.

One method to improve nanocomposite performance is to try functionalized polymers blended with clay. This approach has been limited to materials that are soluble in water or to materials that can be incorporated into the polymerization reaction. This approach has been used to prepare nylon nanocomposites, using for example, oligomeric and monomeric caprolactam as the modifier. Polyolefin nanocomposites, such as polypropylene nanocomposites, have utilized maleic anhydride grafted polypropylenes to form nanocomposites. However, these polypropylene nanocomposites are generally deficient in thermal stability (LTHA) for high physical property demanding nanocomposite applications.

Thus for high stiffness applications such as automotive parts, it would be advantageous to have a nanocomposite that not only improves mechanical properties, but improves thermal stability as well.

SUMMARY

This invention relates to a nanocomposite comprising one or more organoclays and one or more thermoplastic polymers comprising stabilization functionality, and optionally further comprising a non-functionalized thermoplastic polyolefin.

DETAILED DESCRIPTION

For purposes of this invention and the claims thereto, when a polymer or oligomer is referred to as comprising an olefin, the olefin present in the polymer or oligomer is the polymerized or oligomerized form of the olefin, respectively.

Likewise the use of the term polymer is meant to encompass homopolymers and copolymers. In addition the term copolymer includes any polymer having 2 or more monomers. Further, as used herein, the term "polypropylene" means a polymer made of at least 50 weight % propylene units, or at least 70 weight % propylene units, or at least 80 weight % propylene units, or at least 90 weight % propylene units, or at least 95 weight % propylene units or 100 weight % propylene units. The term "polyethylene" means a polymer made of at least 50 weight % ethylene units, or at least 70 weight % ethylene units, or at least 80 weight % ethylene units, or at least 90 weight % ethylene units, or at least 95 weight % ethylene units or 100 weight % ethylene units.

As used herein, the term "alkyl" refers to a paraffinic hydrocarbon group which may be derived from an alkane by dropping one or more hydrogens from the formula, such as, for example, a methyl group, or $CH_3^-$, or an ethyl group, $CH_3CH_2^-$.

As used herein, the term "alkenyl" refers to an unsaturated paraffinic hydrocarbon group which may be derived from an alkane by dropping one or more hydrogens from the formula, such as, for example, an ethenyl group, $CH_2{=}CH^-$, and a propenyl group, or $CH_3CH{=}CH^-$.

As used herein, the term "aryl" refers to a hydrocarbon group that forms a ring structure characteristic of aromatic compounds such as, for example, benzene, naphthalene, phenanthrene, or anthracene, and typically possess alternate double bonding ("unsaturation") within its structure. An aryl group is thus a group derived from an aromatic compound by dropping one or more hydrogens from the formula such as, for example, phenyl, or $C_6H_5^-$.

By "substituted", we intend substitution of at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy alkyl, (straight or branched chain having 1 to 20 carbon atoms which includes methyl, ethyl, propyl, tert-butyl, isopropyl, or isobutyl); alkoxy, (straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy); and haloalkyl, (which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl). Thus, for example, an example of a "substituted styrenic unit" would include p-methylstyrene, or p-ethylstyrene.

In another embodiment this invention relates to a nanocomposite, comprising: organo-clay, and at least one first thermoplastic polyolefin comprising stabilization functionality, the stabilization functionality covalently bonded to the at least one first thermoplastic polyolefin.

In another embodiment this invention relates to a nanocomposite, comprising:

1) from $\geqq$10 to $\leqq$98 wt. % of a non-functionalized polypropylene, based on the total weight of the nanocomposite;

2) from $\geqq$10 to $\leqq$90 wt. % (based on the total weight of the nanocomposite) of a polypropylene comprising stabilization functionality selected from the group consisting of one or more of phenols, ketones, hindered amines, substituted phenols, substituted ketones, substituted hindered amines, or combinations thereof, (preferably the stabilization functionality is present at from $\geqq$0.05 to $\leqq$15 wt %, based on the total weight of the of the polypropylene comprising stabilization functionality);

3) from $\geqq$1 to $\leqq$30 weight % (based on the total weight of the nanocomposite) of an organo-clay selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite or florine mica, where the organo-clay comprises one or more of hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion, distearyl ammonium ion, ammonium salt, pyridinium salt, sulfonium salt, phosphonium salt, or combinations thereof; and 4) optionally, from $\geqq$2 to $\leqq$70 wt % (based on the total weight of the nanocomposite) of an ethylene-propylene elastomeric copolymer or an isobutylene rubber.

The term "non-functionalized polypropylene" means polypropylene that contains less than 0.05 weight % stabilization functionality, preferably less than 0.025 weight %, more preferably less than 0.01 weight %, and preferably contains zero weight % stabilization functionality. The term "non-functionalized elastomer or elastomeric (co)polymer" means the polymer contains less than 0.05 weight % stabilization functionality, preferably less than 0.025 weight %, more preferably less than 0.01 weight %, and preferably contains zero weight % stabilization functionality.

In another embodiment this invention relates to a blend comprising: an organo-clay and at least one polypropylene comprising stabilization functionality (also referred to herein as stabilization functionalized thermoplastic polyolefin) represented by the formula:

$$T\text{-}(R^1G)_n$$

wherein:

each $R^1$ is, independently, a substituted or unsubstituted $C_1$ to $C_{20}$ aliphatic group or a substituted or unsubstituted $C_5$ to $C_{20}$ aromatic group, preferably $R^1$ is a substituted or unsubstituted $C_1$ to $C_{10}$ aliphatic group or a substituted or unsubstituted $C_6$ to $C_{10}$ aromatic group, preferably $R^1$ is a substituted or unsubstituted $C_1$ to $C_5$ aliphatic group, preferably $R^1$ has from 1 to 20 carbon atoms, preferably from 1 to 10 carbon atoms, even more preferably from 1 to 5 carbon atoms and is selected from the group consisting of: aliphatic esters, aliphatic ethers, aliphatic amides, and aliphatic imides;

n is the number of stabilization functional/bridging groups bound to T and may be from 1 to 300, or 1 to 200, or 1-100, or 1-50 (in another embodiment n may be 5 to 300, 10 to 200 or 20 to 100); and G is selected from one or more of phenols, ketones, hindered amines, substituted phenols, substituted ketones, substituted hindered amines, or combinations thereof; and T is a thermoplastic polyolefin.

In another embodiment a blend of organo-clay and at least one stabilization functionalized thermoplastic polyolefin is contemplated, comprising: a) an organo-clay; and b) at least one stabilization functionalized thermoplastic polyolefin represented by the formula:(IV)

$$T\text{-}(R^1G)_n$$

wherein $R^1$ is selected from a $C_1$ to $C_{20}$, $C_1$ to $C_{10}$ or $C_1$ to $C_5$ aliphatic, $C_1$ to $C_{20}$, $C_1$ to $C_{10}$ or $C_1$ to $C_5$ aromatic, substituted $C_1$ to $C_{20}$, $C_1$ to $C_{10}$ or $C_1$ to $C_5$ aliphatic, substituted $C_1$ to $C_{20}$, $C_1$ to $C_{10}$ or $C_1$ to $C_5$ aromatic, $C_1$ to $C_{20}$, $C_1$ to $C_{10}$ or $C_1$ to $C_5$ aliphatic ester, $C_1$ to $C_{20}$, $C_1$ to $C_{10}$ or $C_1$ to $C_5$ aliphatic ether, $C_1$ to $C_{20}$, $C_1$ to $C_{10}$ or $C_1$ to $C_5$ aliphatic amide, $C_1$ to $C_{20}$, $C_1$ to $C_{10}$ or $C_1$ to $C_5$ aliphatic imide, n is the number of stabilization functional/bridging groups bound to T and may be from 1-300, or 1-200, or 1-100, or 1-50; and G is selected from one or more of phenols, ketones, hindered amines, substituted phenols, substituted ketones, substituted hindered amines, or combinations thereof and wherein a thermoplastic polyolefin is represented by T. A preferred embodiment is a fabricated article, comprising such a nanocomposite, wherein the article is one of an automotive part or an appliance part.

In another embodiment, this invention relates to a process for producing a stabilization functionalized thermoplastic polyolefin, comprising: converting a non-stabilization functional group containing thermoplastic polyolefin (T) to stabilization functionality by one of the following reactions to produce a stabilization functionalized thermoplastic polyolefin:

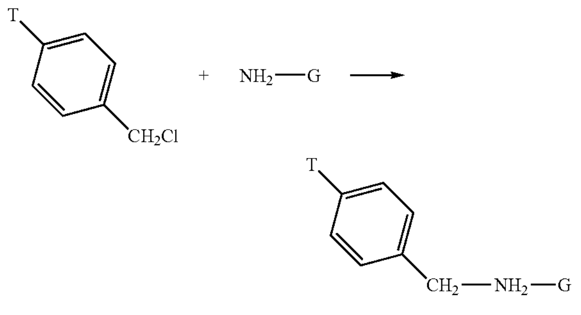

-continued
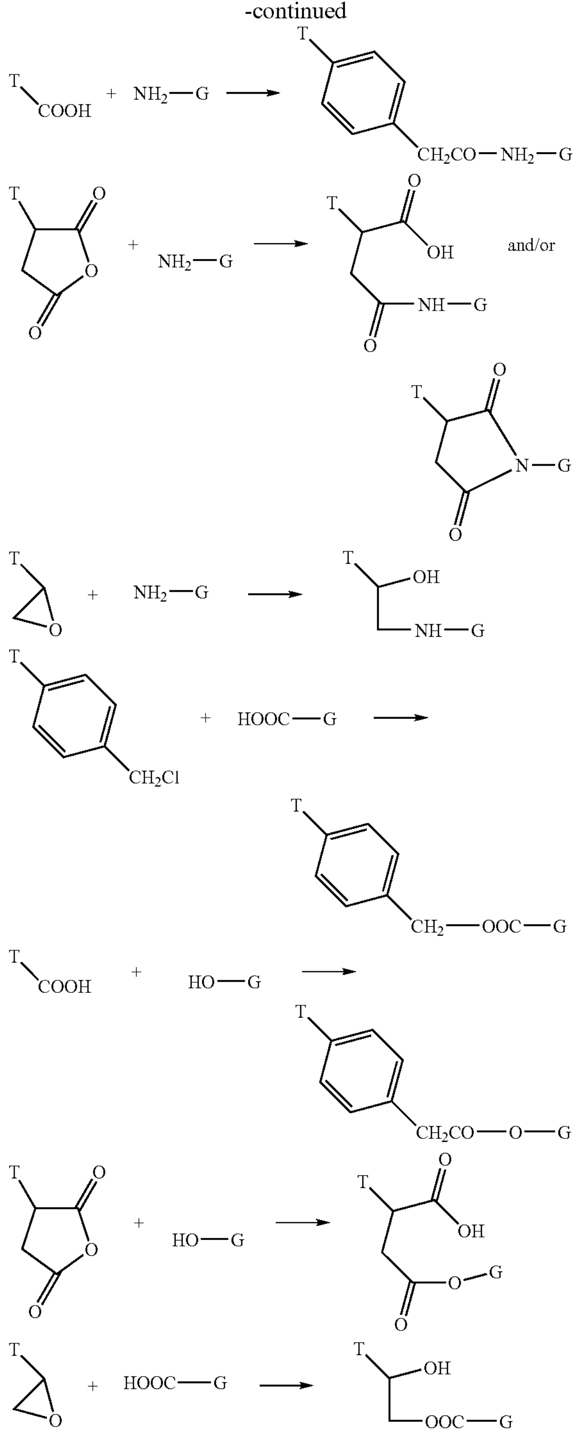
where G is selected from one or more of:
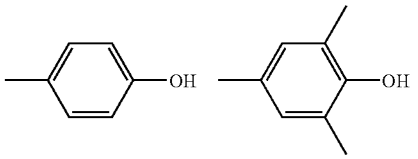
-continued
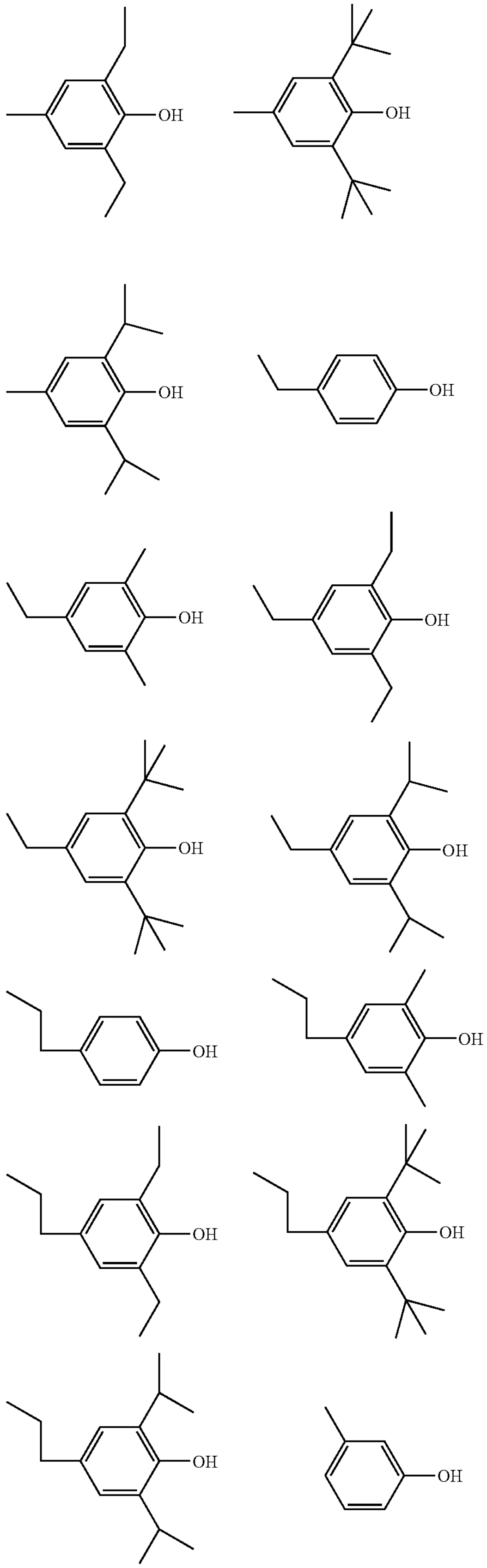

-continued
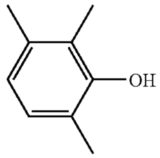
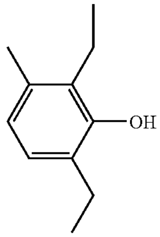
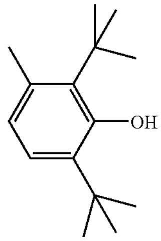
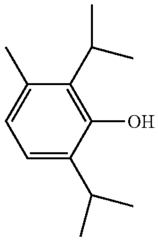
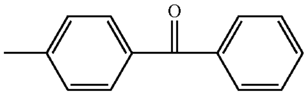
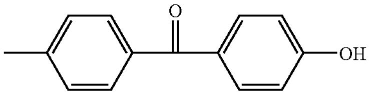
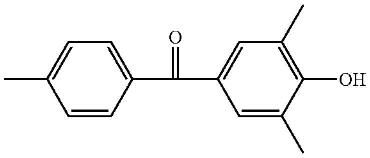
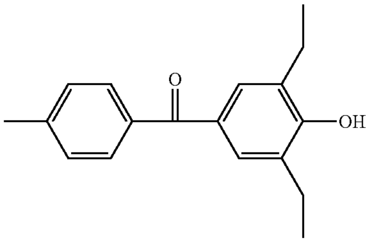
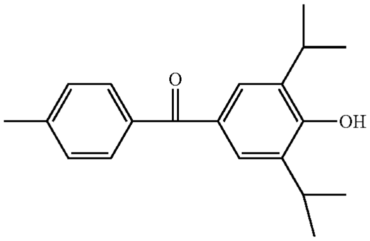
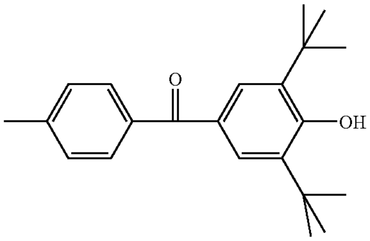
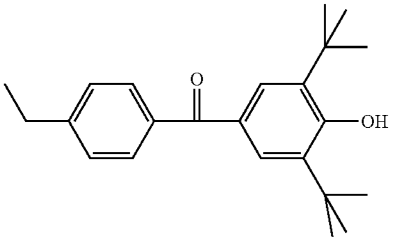
-continued
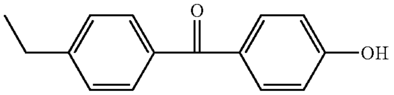
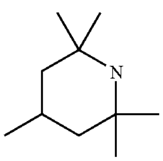
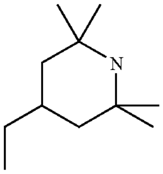
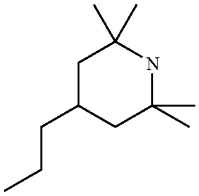
In another embodiment, this invention relates to a process for producing a nanocomposite, comprising:
1) converting a functional group containing thermoplastic polyolefin (T) to a stabilization functionalized thermoplastic polyolefin by one of the following reactions:
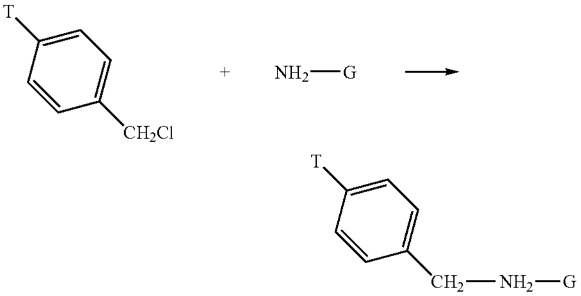
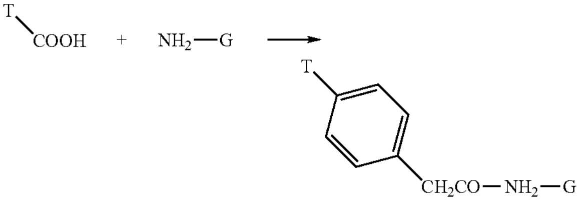
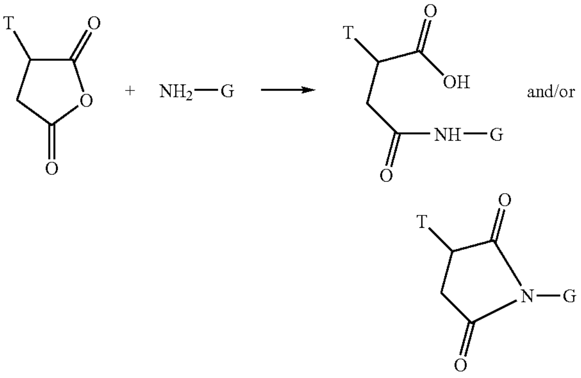
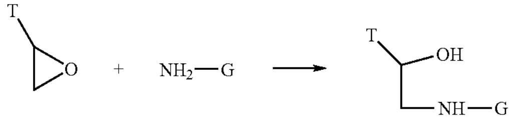
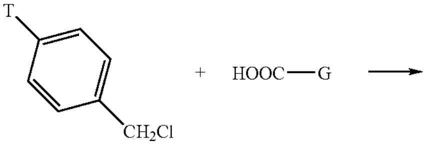

-continued

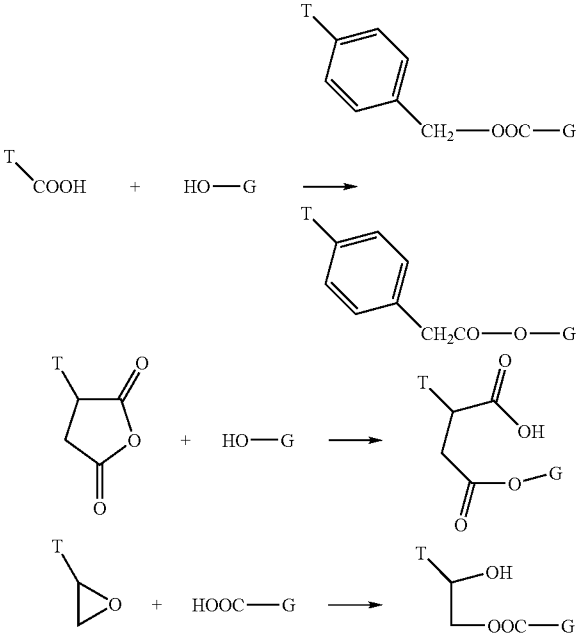

and 2) combining the stabilization functionalized thermoplastic polyolefin with an organo-clay.

In the formulae above and below, T is represented as having one pendant group for convenience sake only. It will be understood that T may have multiple pendant groups.

In another aspect this invention relates to: A first embodiment of a nanocomposite comprising at least one stabilization functionalized thermoplastic polyolefin, the thermoplastic polyolefin comprising one or more interpolymers of $C_2$ to $C_7$ α-olefin derived units with stabilization functionality covalently bonded to the polymer backbone, and at least one organo-clay. In another embodiment, a nanocomposite comprises at least one stabilization functionalized thermoplastic polyolefin comprising stabilizing functional groups, which groups are also generally polar, selected from one or more of phenols, ketones, hindered amines, substituted phenols, substituted ketones, substituted hindered amines, or combinations thereof; an organo-clay; and a substantially non-functionalized thermoplastic polyolefin. In another embodiment, a nanocomposite comprises at least one stabilization functionalized thermoplastic polyolefin; an organo-clay; a substantially non-functionalized thermoplastic; and a non-functionalized elastomeric polymer. In another embodiment, a nanocomposite comprises at least one stabilization functionalized thermoplastic polyolefin; an organo-clay; an optional substantially non-functionalized thermoplastic polyolefin; and/or an optional non-functionalized elastomeric polymer; and/or a functionalized thermoplastic polyolefin where the functionality is not stabilization functionality; and/or an optional non-organo-clay filler. In another embodiment a process for introducing thermal stabilization functionality on a thermoplastic polyolefin backbone is contemplated comprising reacting a non-stabilization functionalized thermoplastic polyolefin with the reactions shown herein.

Stabilization Functionalized Thermoplastic Polyolefins

Preferred thermoplastic polyolefins useful as the basis for the stabilization functionalized thermoplastic polyolefin may be any thermoplastic polyolefin functionalized by any suitable technique known in the art that will result in the thermoplastic polyolefin having stabilization functionality described herein, the stabilization functionality covalently bonded to the thermoplastic polyolefin backbones. Likewise, the stabilization functionalized thermoplastic polyolefin may be produced by co-polymerizing olefins such as one or more of those noted herein, and at least one other olefin bearing the desired stabilization functionality. For example, co-polymerizing propylene and hydroxylstyrene produces propylene with phenol functionality, as shown in U.S. Pat. No. 2,982,756. In another embodiment, the functionalized thermoplastic polyolefin may be obtained by converting a non-stabilizing functional group into phenol, hindered amine, or ketone. For example, maleic anhydride functionalized polypropylene is commercially available and can be reacted with aminophenol to produce polypropylene with phenol grafted to the backbone. In another embodiment the stabilization functionalized thermoplastic polyolefin may be produced by free radical grafting as shown in WO 9809995.

The following formulae represent polypropylene with stabilization functionality useful in this invention. Any polypropylene disclosed herein may be used in the "polypropylene" portion, including random copolymers (RCP), homopolymers, or impact copolymers (ICP) and within those, copolymers of propylene and one or more of ethylene and/or α-olefins. Additionally, the "polypropylene" may be substituted with "polyethylene", and we contemplate any polyethylene as herein defined may be so substituted. Such polyethylenes include homopolymers, and copolymers of ethylene and one or more α-olefins.

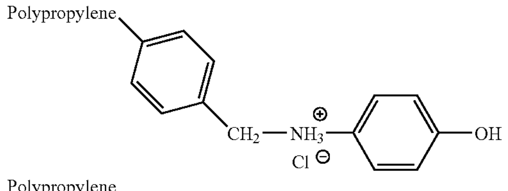

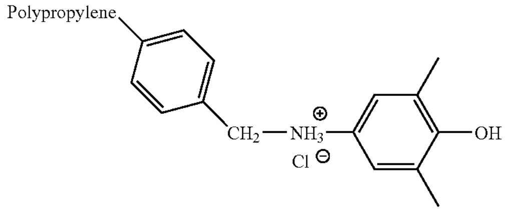

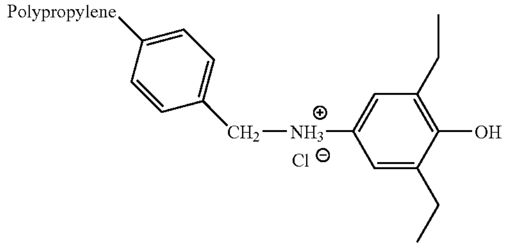

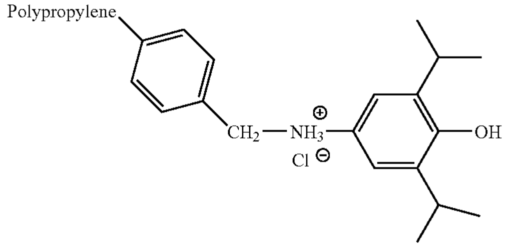

-continued
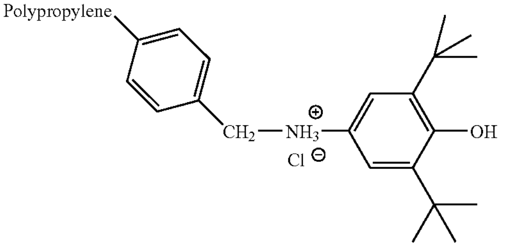
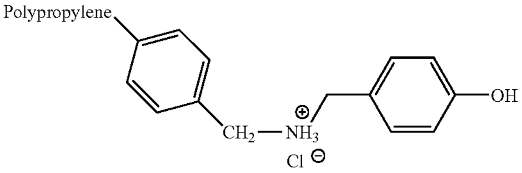
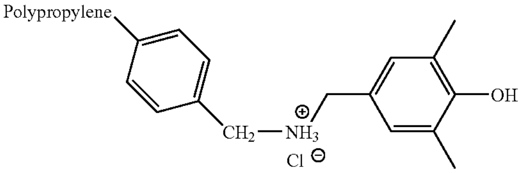
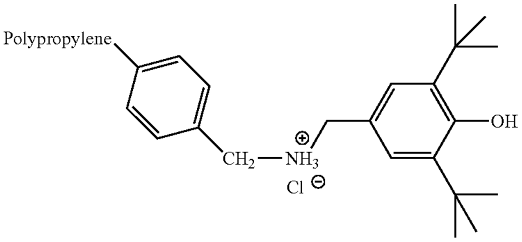
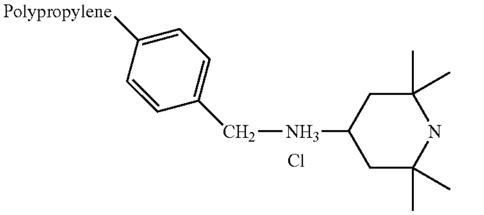
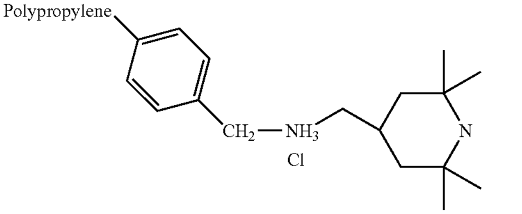
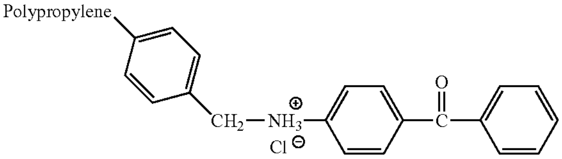
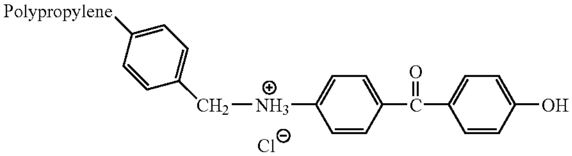
-continued
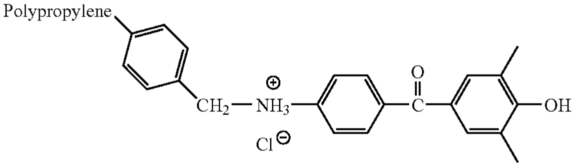
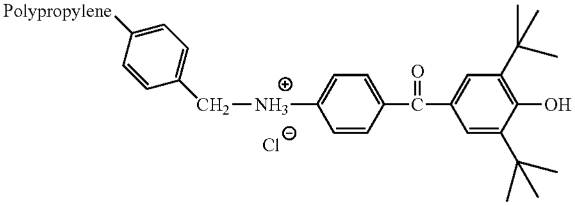
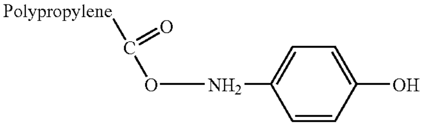
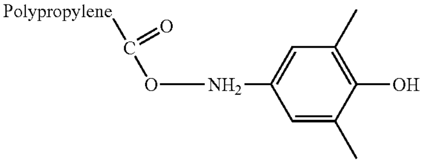
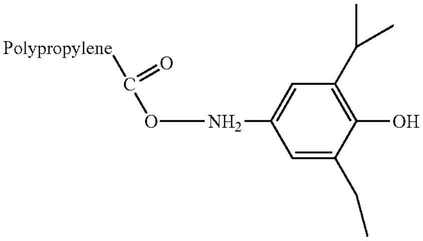
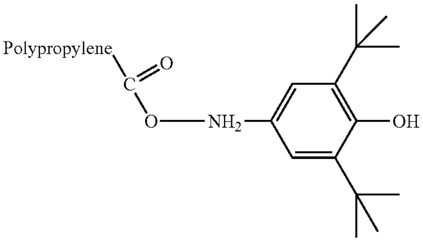
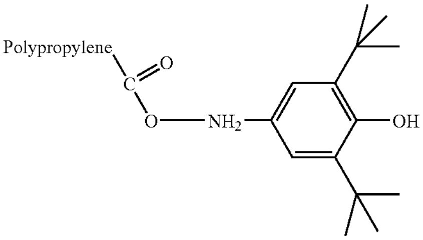
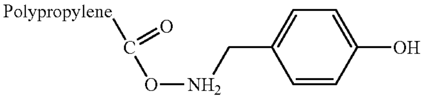
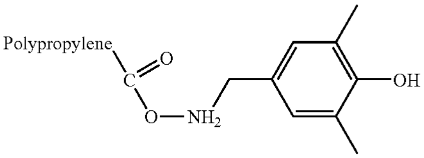

-continued
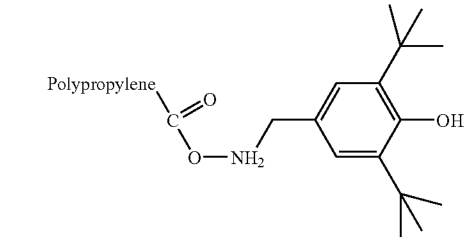
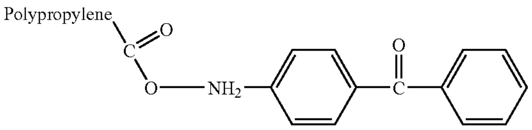
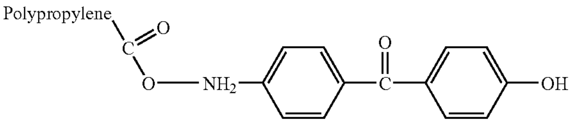
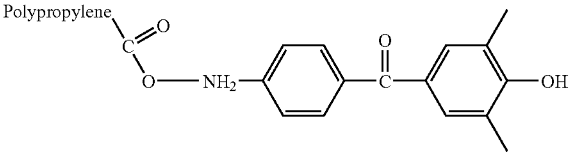
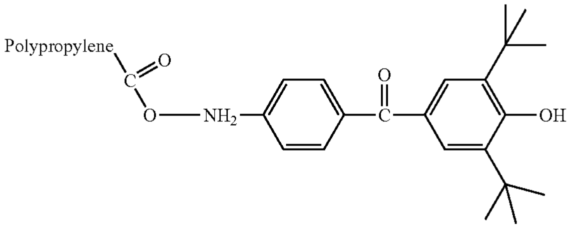
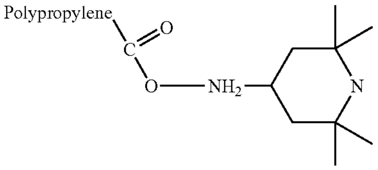
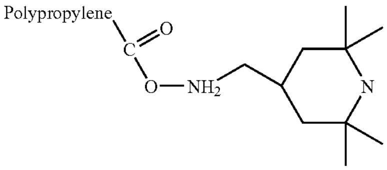
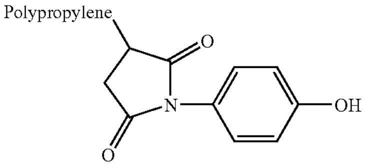
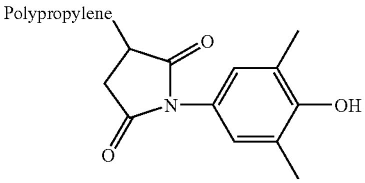
-continued
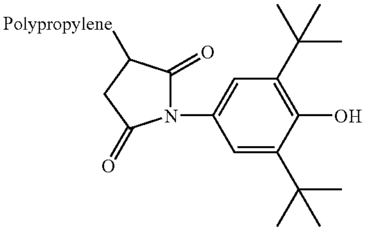
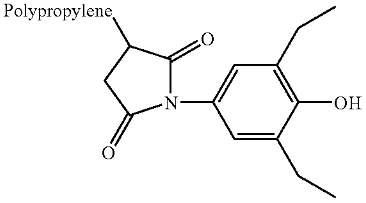
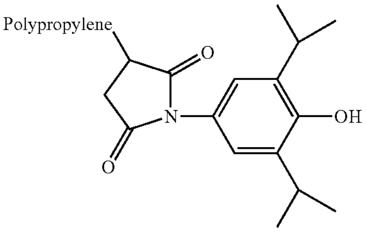
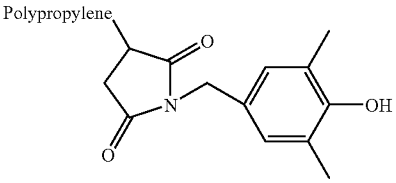
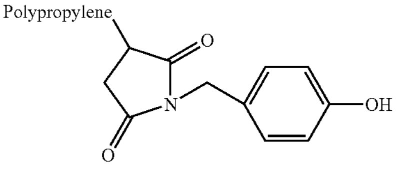
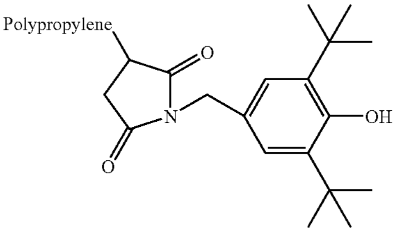
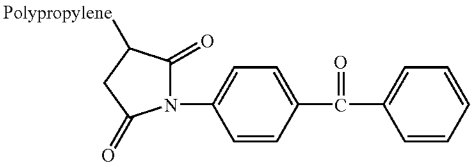
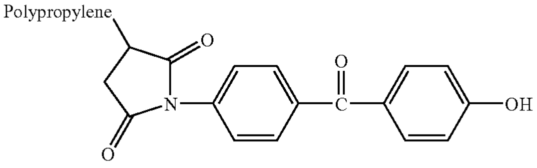

-continued
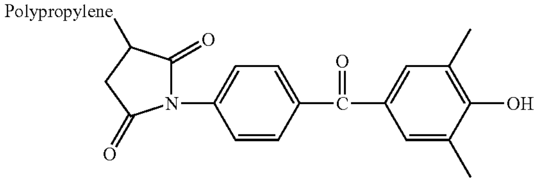
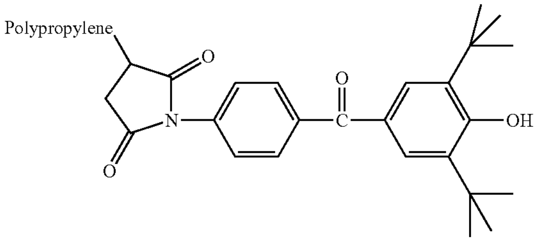
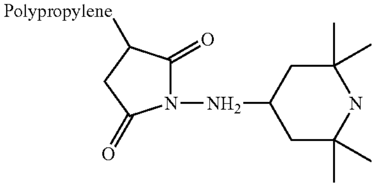
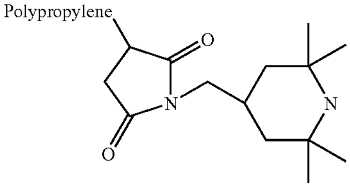
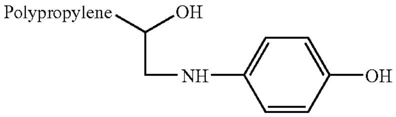
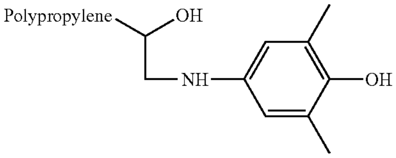
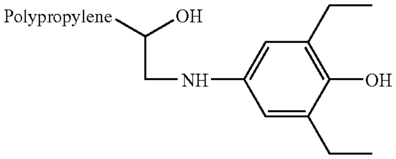
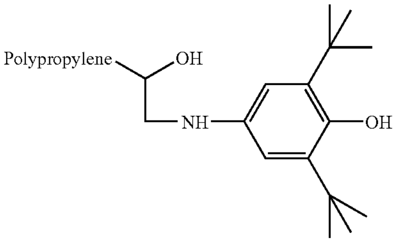
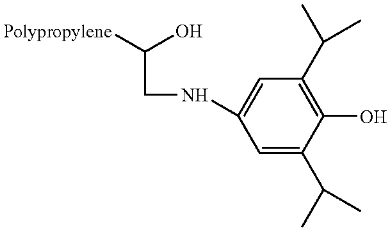
-continued
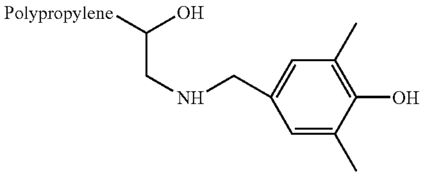
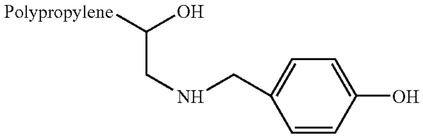
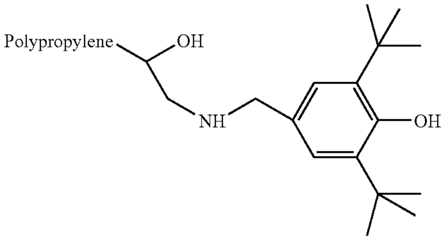
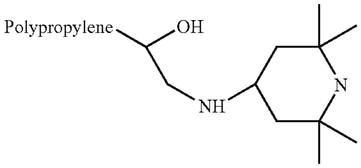
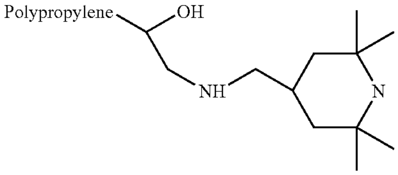
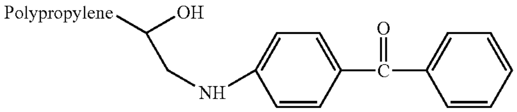
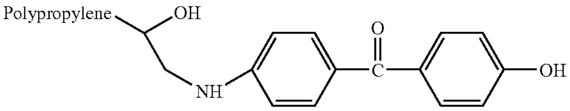
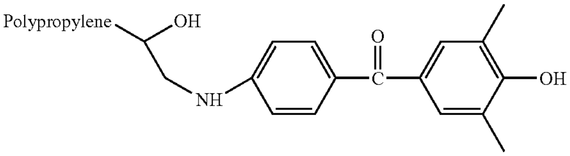
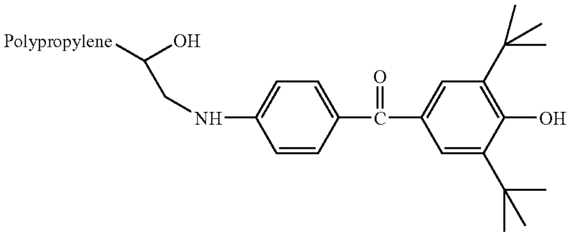
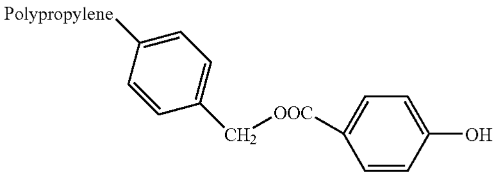

-continued
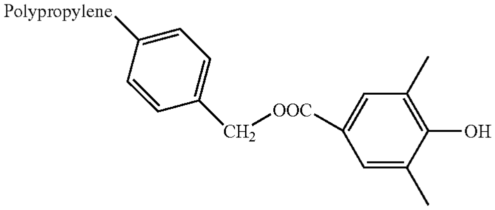
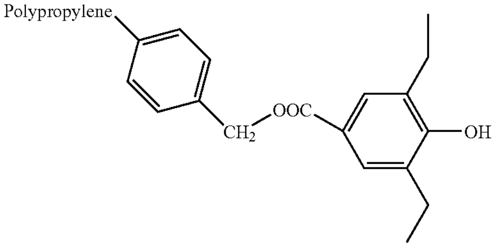
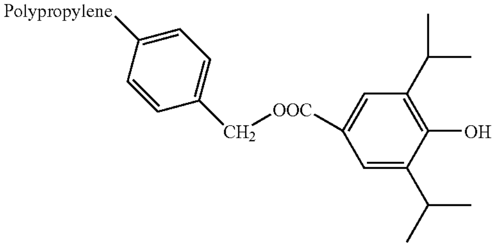
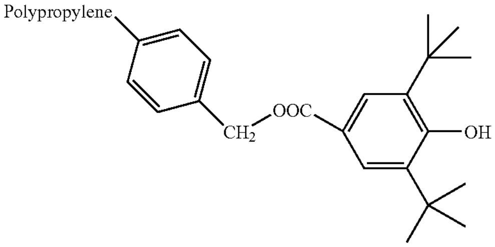
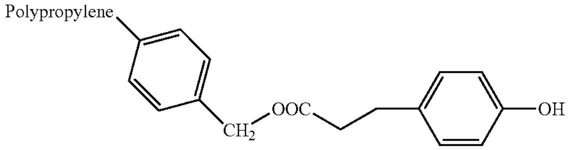
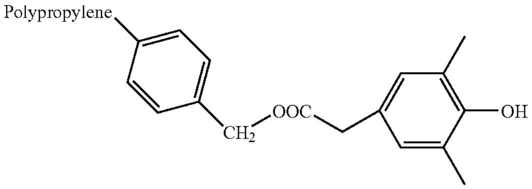
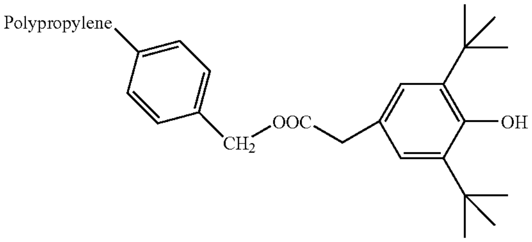
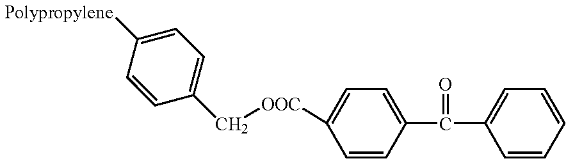
-continued
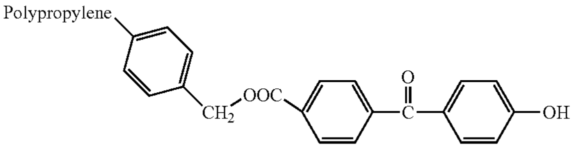
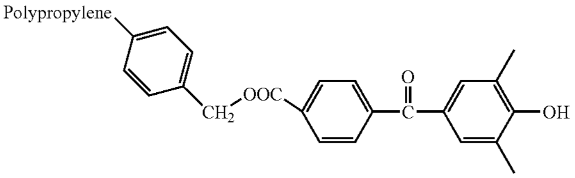
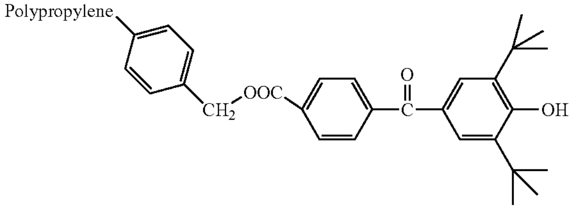
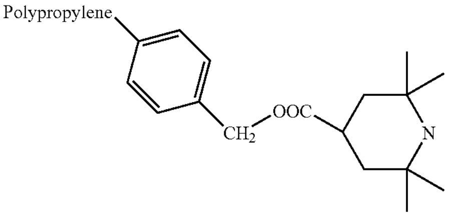
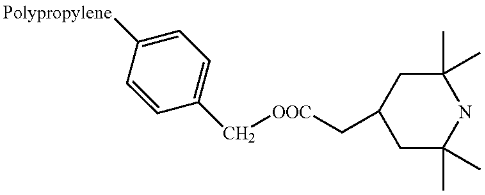
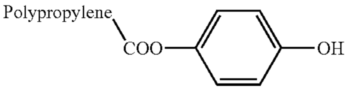
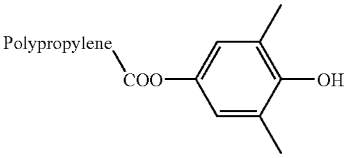
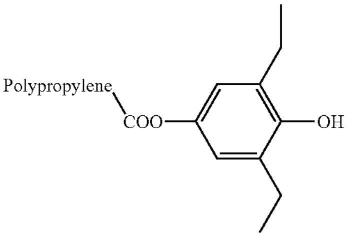
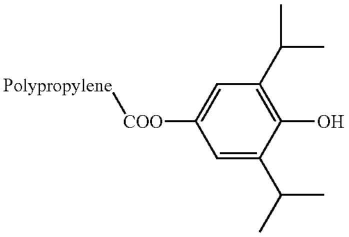

-continued

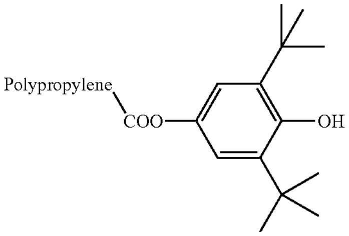

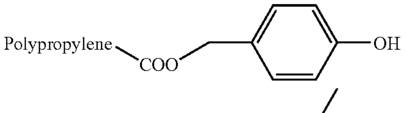

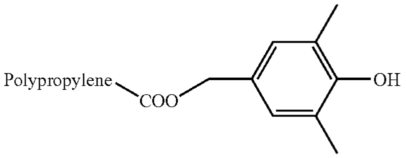

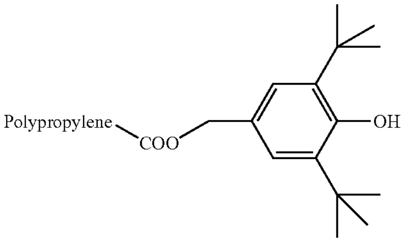

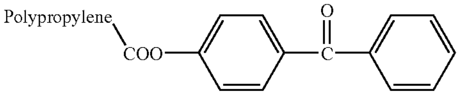

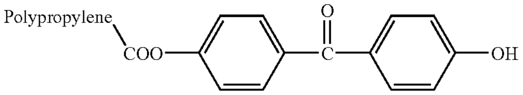

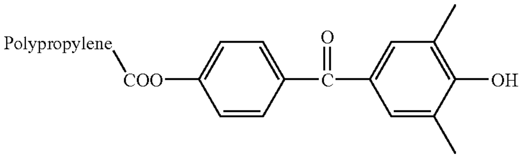

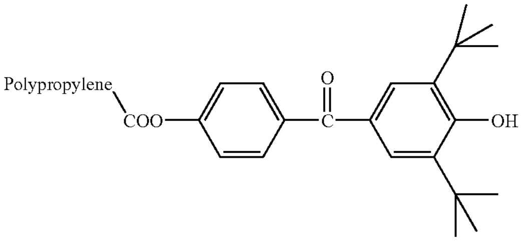

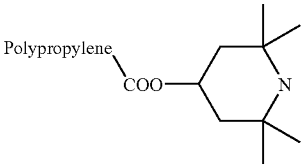

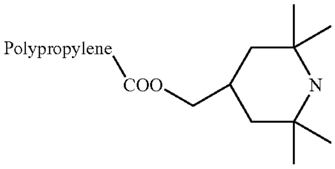

The stabilization functionalized thermoplastic polyolefin may be present in the nanocomposite at from ≧1, or ≧2, or ≧3, or ≧5 or ≧6, or ≧7, or ≧8, or ≧9, or ≧10, or ≧12, or ≧15, or ≧20 wt. % and ≦99, or ≦95, or ≦90, or ≦85, or ≦80, or ≦75, or ≦70, or ≦65, or ≦60, or ≦55, or ≦50, or ≦45, or ≦40, or ≦35, or ≦30, or ≦25, or ≦20, or ≦15 or ≦10, or ≦5 wt. %, based on the total weight of the nanocomposite. In yet another embodiment, a desirable range may be any combination of any upper limit with any lower limit.

Stabilization Functionality

In the stabilization functionalized thermoplastic polyolefin, the stabilization functional group or groups may be described as G in the formula:

$$T\text{-}(R^1G)_n$$

each $R^1$ is, independently, a substituted or unsubstituted $C_1$ to $C_{20}$ aliphatic group or a substituted or unsubstituted $C_5$ to $C_{20}$ aromatic group, preferably $R^1$ is a substituted or unsubstituted $C_1$ to $C_{10}$ aliphatic group or a substituted or unsubstituted $C_6$ to $C_{10}$ aromatic group, preferably $R^1$ is a substituted or unsubstituted $C_1$ to $C_5$ aliphatic group, preferably $R^1$ has from 1 to 20 carbon atoms, preferably from 1 to 10 carbon atoms, even more preferably from 1 to 5 carbon atoms and is selected from the group consisting of: aliphatic esters, aliphatic ethers, aliphatic amides, and aliphatic imides;

n is the number of stabilization functional/bridging groups bound to T and may be from 1 to 300, or 1 to 200, or 1-100, or 1-50 (in another embodiment n may be 5 to 300, 10 to 200 or 20 to 100); and G is selected from one or more of phenols, ketones, hindered amines, substituted phenols, substituted ketones, substituted hindered amines, or combinations thereof; and T is a thermoplastic polyolefin.

In a preferred embodiment G is represented by the formulae:

(I)

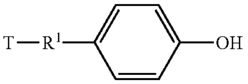

(II)

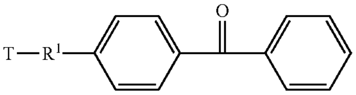

(III)

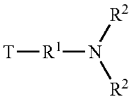

and G is covalently bonded (for definition of "covalent bond or bonding", see "Advanced Organic Chemistry: Reactions, Mechanisms, and Structures", 3rd Edition, Jerry March, 1985, John Wiley and Sons) to T (T is a thermoplastic polyolefin), where $R^1$ is as described above and each $R^2$ is, independently, a $C_1$ to $C_{10}$ aliphatic group, preferably a $C_1$ to $C_5$ aliphatic group, more preferably a $C_1$ to $C_3$ aliphatic group, and wherein phenols, ketones, hindered amines, may be substituted with an aliphatic group In a preferred embodiment, the functionalizing compound or compounds include compounds that will either facilitate the addition or "grafting" of the functional groups (G) onto the thermoplastic polyolefin (T) of embodiments of the invention or a compound that itself is grafted onto the thermoplastic polyolefin (T).

The stabilization functionalization of the thermoplastic polyolefin may typically be carried out at a temperatures of from 50° C. to 200° C., for times sufficient to add the functional group.

Suitable reactions to convert functional groups to stabilization functionality are represented by the following:

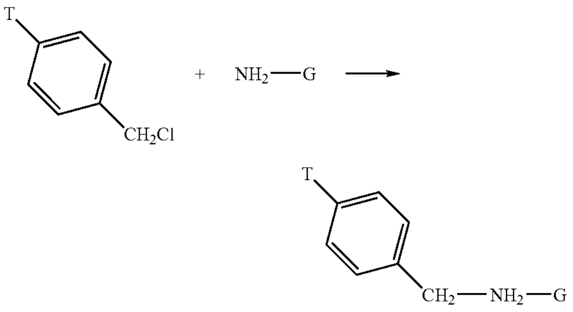

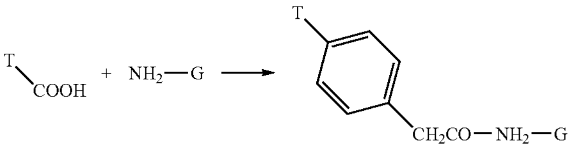

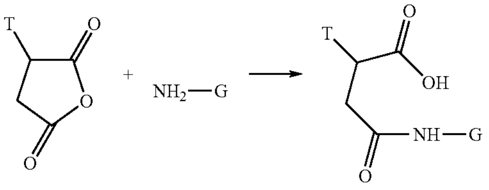

and/or

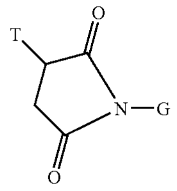

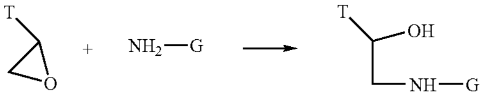

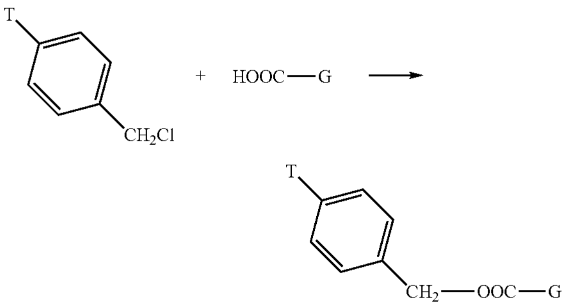

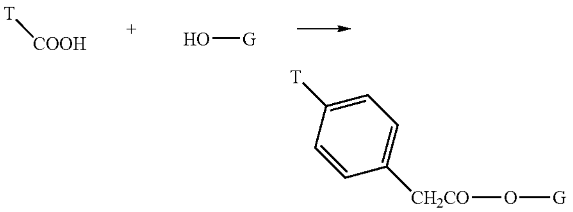

-continued

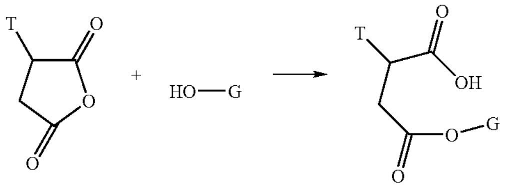

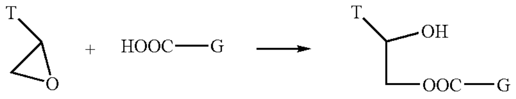

where T is the thermoplastic polyolefin and G is selected from one or more of following groups:

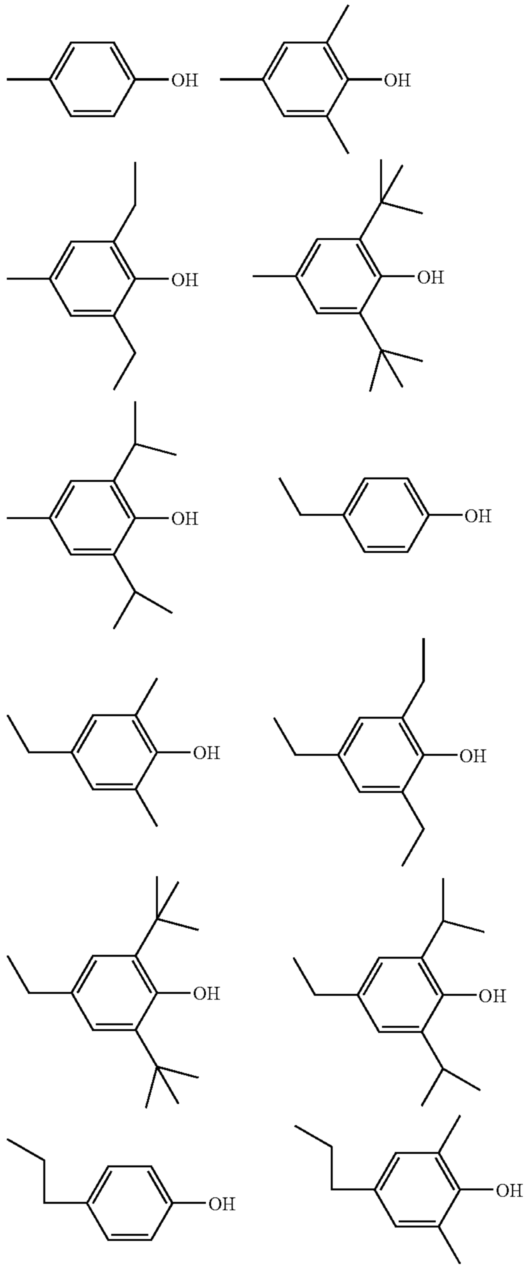

-continued

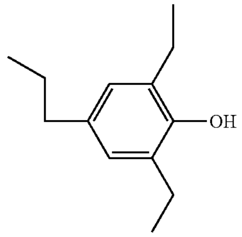

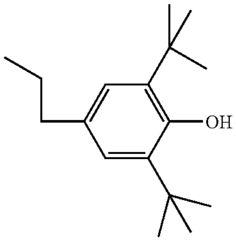

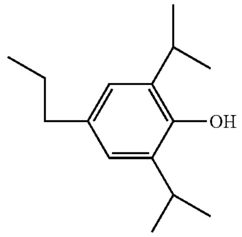

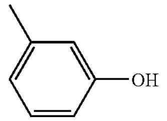

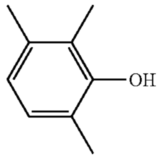

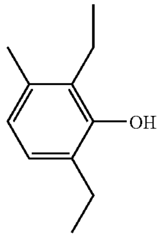

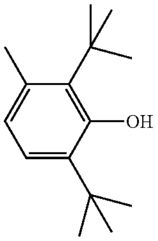

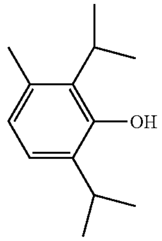

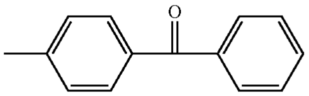

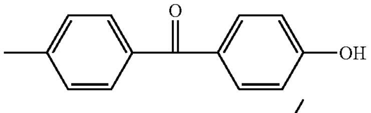

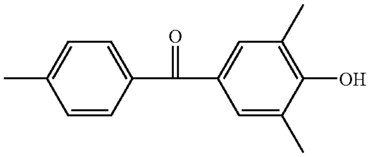

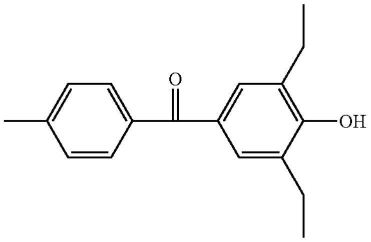

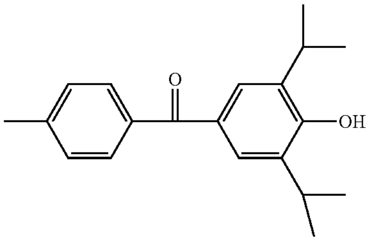

-continued

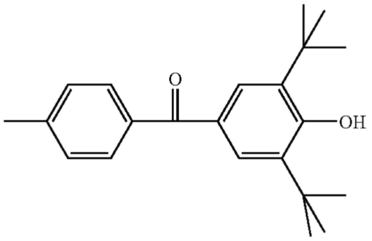

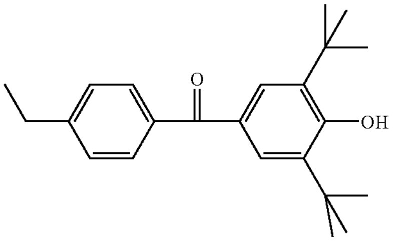

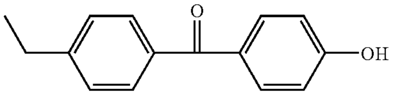

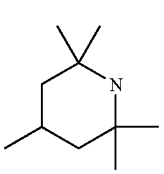

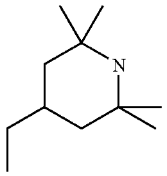

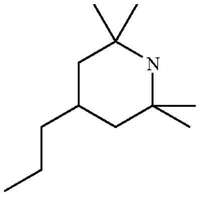

The stabilization functional groups on the thermoplastic polyolefin may be present from ≧0.05 wt %, or ≧0.1, or ≧0.5, or ≧1.0 wt % or ≦15 wt %, or ≦8 wt %, or ≦10 wt %, or ≦5 wt % or, ≦4 wt %, based on the total weight of the stabilization functionalized thermoplastic polyolefin. Or the stabilization functional groups on the thermoplastic polyolefin backbone will be present in an effective amount combined with an effective amount of the organo-clay to increase the flexural modulus and/or the heat aged performance of nanocomposites containing at least one of each, the increases as noted herein.

Organo-Clay

Nanocomposites of embodiments of the invention include at least one stabilization functionalized thermoplastic polyolefin blended by any suitable means with at least one organo-clay. “Organo-clays” are clays or other layered materials that have been treated with organic molecules (also called exfoliating agents) capable of undergoing ion exchange reactions with the cations present at the interlayer surfaces of the layers. Preferred clay materials useful in this invention include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, as well as vermiculite, halloysite, aluminate oxides, or hydrotalcite. Other useful layered materials include micaceous minerals, such as illite and mixed layered illite/smectite minerals, such as rectorite, tarosovite, ledikite and admixtures of illites with the clay minerals named above. Any swellable layered material that sufficiently sorbs the organic molecules to increase the interlayer spacing between adjacent phyllosilicate platelets to at least 5 Å, or to at least 10 Å, (when the phyllosilicate is measured dry) may be used in the practice of this invention.

Preferred organic molecules useful for treating the clays and layered materials include cationic surfactants such as ammonium, alkylammonium (primary, secondary, tertiary and quaternary), phosphonium or sulfonium derivatives of aliphatic, aromatic or arylaliphatic amines, phosphines or sulfides. Such organic molecules are among the "exfoliating agents" discussed herein.

Additional preferred organic molecules useful for treating the clays and layered materials include amine compounds (or the corresponding ammonium ion) with the structure $R^3R^4R^5N$, wherein $R^3$, $R^4$, and $R^5$ are $C_1$ to $C_{30}$ alkyls or alkenes in one embodiment, $C_1$ to $C_{20}$ alkyls or alkenes in another embodiment, which may be the same or different. In one embodiment, the organic molecule is a long chain tertiary amine where $R^3$ is a $C_{14}$ to $C_{20}$ alkyl or alkene. In another embodiment, R4 and or R5 may also be a $C_{14}$ to $C_{20}$ alkyl or alkene.

Another class preferred organic molecules useful for treating the clays and layered materials includes those which can be covalently bonded to the interlayer surfaces. These include polysilanes of the structure $—Si(R^6)_2R^7$ where $R^6$ is the same or different at each occurrence and is selected from alkyl, alkoxy or oxysilane and $R^7$ is an organic radical compatible with the matrix polymer of the composite.

Other suitable organic molecules useful for treating the clays and layered materials include protonated amino acids and salts thereof containing 2-30 carbon atoms such as 12-aminododecanoic acid, epsilon-caprolactam and like materials. Suitable swelling/exfoliating agents and processes for intercalating layered silicates are disclosed in U.S. Pat. Nos. 4,472,538, 4,810,734, 4,889,885 as well as WO92/02582.

In one embodiment, the preferred organic molecules useful for treating the clays and layered materials include all primary, secondary and tertiary amines and phosphines; alkyl and aryl sulfides and thiols; and their polyfunctional versions. Particularly preferred organic molecules useful for treating the clays and layered materials include: long-chain tertiary amines such as N,N-dimethyl-octadecylamine, N,N-dioctadecyl-methylamine, so called dihydrogenated tallow-alkyl-methylamine and the like, and amine-terminated polytetrahydrofuran; long-chain thiol and thiosulfate compounds like hexamethylene sodium thiosulfate.

Particularly preferred organic molecules include:

methyl, tallow, bis-2-hydroxyethyl, quaternary ammonium;

dimethyl, benzyl, hydrogenatedtallow quaternary ammonium;

dimethyl, dihhydrogenatedtallow, quaternary ammonium);

dimethyl, hydrogenatedtallow, 2-ethylhexyl quaternary ammonium;

di-methyl di-hydrogenated tallow alkyl ammonia chloride; and methyl, dihhydrogenatedtallow, ammonium).

The amount of organo-clay incorporated in the nanocomposites in accordance with embodiments of the invention, is preferably an effective amount to provide an improvement in the flexural modulus properties and heat aging of the nanocomposite. In particular invention compositions preferably have:

a) a modulus enhancement of ≧1%, or ≧3%, or ≧5%, or ≧10%, or ≧20%, or ≧30%, as determined by ASTM D790A as compared to the same blend without the stabilization functionality; and or b) a heat aged performance enhancement of ≧1, or ≧3, or ≧5, or ≧7, or ≧9, or ≧10%, or ≧20%, or ≧30%, or ≧40%, or ≧50%, or ≧60%, or ≧70%, or ≧80%, or ≧90%, or ≧100% as compared to the same blend without the stabilization functionality, as determined by ASTM D3012-00.

The enhancements in modulus and heat aged performance are determined by comparing the inventive blend with a reference nanocomposite blend prepared with identical ingredients in identical amounts and tested under identical conditions, except that the thermoplastic polymer does not contain the stabilization functionality. Instead the polymer used is a thermoplastic polyolefin functionalized with a non-stabilization functionality. Such non-stabilizing functionality may be selected from one or more of maleic anhydride, himic anhydride, succinic anhydride, acrylic acid, methacrylic acid, methyl acrylate, ethyl acrylate, butyl acrylate or combinations thereof.

Amounts of organo-clay present in the nanocomposites of embodiments of our invention preferably range from ≧0.5 wt %, or ≧0.75 wt %, or ≧1 wt %, or ≧2 wt %, or ≧3 wt %, or ≧4 wt %, or ≧5 wt %, or ≧7 wt %, or ≧9 wt %, or ≧10 wt %, or ≧12 wt %, or ≧15 wt %, or ≧20 wt %, and ≦99 wt %, or ≦95 wt %, or ≦90 wt %, or ≦80 wt %, or ≦70 wt %, or ≦60 wt %, or ≦50 wt %, or ≦45 wt %, or ≦40 wt %, or ≦35 wt %, or ≦30 wt %, or ≦25 wt %, or ≦20 wt %, or ≦15 wt %, or ≦10 wt %, or ≦9 wt %, or ≦8 wt %, or ≦7 wt %, or ≦6 wt % or ≦5 wt % based on the total weight of nanocomposite. In yet another embodiment, a desirable range may be any combination of any upper limit with any lower limit. In another embodiment the nanoclay is present at 0.5 weight % to 90 weight %, based upon the weight of the nanoclay and the polymers present, more preferably the nanoclay is present at 0.5 weight % to 90 weight %, preferably 3 weight % to 80 weight %, preferably, 5 weight % to 70 weight %, more preferably 10 weight % to 60 weight %.

Commercial examples of useful organo-clays are available from Southern Clay Products, Gonzalez, Tex. as Cloisite®. Other such materials are available as NANOMER®, from Nanocor Inc., Arlington Heights, Ill. Preferred Southern Clay products are Cloisite® 30B, 10A, 15A, 20A, 25A, 6A and 93A which are believed to be modified with MT2EtOH (methyl, tallow, bis-2-hydroxyethyl, quaternary ammonium), 2MBHT (dimethyl, benzyl, hydrogenatedtallow quaternary ammonium), 2M2HT (dimethyl, dihhydrogenatedtallow, quaternary ammonium), 2MHTL8 (dimethyl, hydrogenatedtallow,2-ethylhexyl quaternary ammonium), and or di-methyl di-hydrogenated tallow alkyl ammonia chloride, M2HT (methyl, dihhydrogenatedtallow, ammonium).

Optional Non-Functionalized Thermoplastic Polyolefins

Non-functionalized thermoplastic polyolefins suitable as optional additional blend components of the nanocomposites of embodiments of the present invention comprise $C_2$ to $C_{10}$ α-olefin derived units. As used herein, the term "α-olefin" comprises ethylene, propylene, 1-butene, 1-pentene, 4-methyl-1-pentene, 1-hexene, 1-octene, 1-nonene, or 1-decene. Thermoplastic polyolefins contemplated include polypropylene homopolymers and copolymers selected from one or more of, propylene ethylene copolymers, propylene 1-butene; propylene 1-pentene; propylene 4-methyl-1-pentene; propylene 1-hexene; propylene 1-octene; propylene 1-decene; propylene ethylene 1-butene; propylene ethylene 1-hexene; propylene ethylene 1-octene; propylene 1-butene 1-hexene; propylene 1-butene 1-octene; propylene 1-hexene 1-octene, or combinations thereof. The polyethylenes contemplated in certain embodiments of the present invention, include ethylene alpha-olefin copolymers. By copolymers we intend combinations of ethylene and one or more alpha-olefins. In general the alpha-olefins comonomers can be selected from those having 3 to 20 carbon atoms. Specifically the combinations may include ethylene 1-butene; ethylene 1-pentene; ethylene 4-methyl-1-pentene; ethylene 1-hexene; ethylene 1-octene; ethylene decene; ethylene dodecene; ethylene, 1-butene, 1-hexene; ethylene, 1-butene, 1-pentene; ethylene, 1-butene, 4-methyl-1-pentene; ethylene, 1-butene, 1-octene; ethylene, 1-hexene, 1-pentene; ethylene, 1-hexene, 4-methyl-1-pentene; ethylene, 1-hexene, 1-octene; ethylene, 1-hexene, decene; ethylene, 1-hexene, dodecene; ethylene, propylene, 1-octene; ethylene, 1-octene, 1-butene; ethylene, 1-octene, 1-pentene; ethylene, 1-octene, 4-methyl-1-pentene; ethylene, 1-octene, 1-hexene; ethylene, 1-octene, decene; ethylene, 1-octene, dodecene; and/or combinations thereof.

The comonomer or comonomers are preferably present in the copolymers in the range of from 0.1 to 40 mole percent. The actual amount of comonomers will generally define the density range and all members of these ranges. Density ranges contemplated to be useful include 0.86-0.97 g/cc and all portions and constituents of the range. Included are the 0.86-0.915 g/cc (plastomers) 0.916-0.925 (LLDPE), 0.926-0.940 (MDPE), and 0.941-0.970 (HDPE). Melt indices contemplated include 0.001-30, or 0.5 to 5.0 for blown films, and 0.3-10 for blow molding, and all members of these ranges (melt index in dg/min or g/10 minutes). LLDPE refers to ethylene-butene, ethylene-hexene, or ethylene-octene copolymers prepared from Ziegler-Natta or metallocene catalysts in gas phase, solution phase or slurry processes. LLDPE's with a MI ranging 0.5-20 dg/min, density ranging 0.910-0.935 g/cc, comonomer type $C_3$-$C_8$, made in either a solution or gas phase process would be acceptable without departing from the spirit of this work. Suitable LLDPEs include those having a density greater than 0.900 g/cc, or in the range of from 0.900 to 0.940 g/cc. The LLDPEs may also have wide ranging MIs, generally up to 30 g/10 min., or between 0.5 to 10 g/10 min. Such LLDPEs and methods for making the same are well known in the art and are readily available commercially under trade names such as Escorene® LLDPE or Dowlex®, by way of example. HDPE refers an to ethylene homo- or copolymers of relatively high molecular weight and relatively low comonomer content prepared from, Ziegler catalysts or metallocene catalysts in gas phase, solution, or slurry processes. The HDPE could be prepared from a variety of different process types. MI's 0.05-20 dg/min and densities 0.920-0.960 g/cc are contemplated.

In a preferred embodiment, the non-functionalized thermoplastic polyolefin comprises $\leqq 1$, or $\leqq 0.7$, or $\leqq 0.5$, or $\leqq 0.3$, or $\leqq 0.1$, or $\leqq 0.05$, or $\leqq 0.01$, or $\leqq 0.001$ or $\leqq 0.0001$ weight percent of a functional group, that is not stabilization functionality, and less than 0.05 weight % of stabilization functionality, based on the total weight of non-functionalized thermoplastic polyolefin, where the functional group is selected from one of hydroxide, aryls and substituted aryls, halogens, alkoxys, carboxylates, esters, carbon unsaturations, acrylates, oxygen, nitrogen, and carboxyls, or combinations thereof and the stabilization functionality is selected from phenols, ketones, hindered amines, substituted phenols, substituted ketones, substituted hindered amines, or combinations thereof.

In a preferred embodiment, the stabilization functionalized thermoplastic polyolefin and the non-stabilization functionalized thermoplastic polyolefin may be based on the same set of homopolymers, copolymers terpolymers or combinations thereof previously discussed herein, and each may be the same or different thermoplastic polyolefin, preferably when the thermoplastic polyolefins are miscible as also defined herein. For example, if the stabilization functionalized thermoplastic polyolefin is polypropylene with phenol grafted to the back bone, a non-stabilization functionalized thermoplastic polyolefin might be chosen from identical polypropylene (e.g., both being polypropylene homopolymers,) or different thermoplastic polyolefins (e.g., polypropylene homopolymer for one and random copolymer, impact copolymer, ethylene homopolymers or ethylene copolymers for the other(s)) to the extent the two thermoplastic polyolefins are miscible as defined herein.

The nanocomposite may also include other secondary or tertiary non-functionalized thermoplastic polyolefins, and/or fillers other than the at least one organo-clay, and then the nanocomposite subjected to well known fabrication techniques to form an article of manufacture that may be suitable for plastics applications, such as molding and/or extrusion, producing formed articles useful as automotive or appliance parts.

The optional at least one non-functionalized thermoplastic polyolefin may be present in the nanocomposite from $\geqq 1$, or $\geqq 3$, or $\geqq 5$, or $\geqq 7$, or $\geqq 9$, or $\geqq 10$, or $\geqq 12$, or $\geqq 15$, or $\geqq 20$, or $\geqq 25$, or $\geqq 30$, or $\geqq 35$, or $\geqq 45$ or $\geqq 50$, and $\leqq 90$, or $\leqq 80$, or $\leqq 70$, or $\leqq 60$, or $\leqq 50$, or $\leqq 45$, or $\leqq 40$, or $\leqq 35$, or $\leqq 30$, or $\leqq 25$, or $\leqq 20$, or $\leqq 15$ or $\leqq 10\%$ weight percent, based on the total weight of nanocomposite. In yet another embodiment, a desirable range may be any combination of any upper limit with any lower limit.

The optional at least one non-functionalized thermoplastic polyolefin and/or the optional functionalized thermoplastic polyolefin not containing stabilization functionality discussed herein, when combined with the at least one stabilization functionalized thermoplastic polyolefin, will preferably each be miscible with the other. The term "miscible" as used herein means that the blended thermoplastic polyolefins show a substantially single glass transition temperature (Tg) peak when subjected to Dynamic Mechanical Thermal Analysis (hereinafter DMTA). A single Tg peak is to be contrasted with a dual or multi-hump curvature in the DMTA trace which is the plot of tan-delta versus temperature.

In another embodiment of the invention, the thermoplastic polyolefin polymer portion of the stabilization functionalized thermoplastic polyolefin polymer and/or the thermoplastic polyolefin portion of the non-functionalized thermoplastic polyolefin, and/or functionalized thermoplastic polyolefins not containing stabilization functionality may be selected from the propylene thermoplastic polyolefins or the ethylene thermoplastic polyolefins listed above or below.

In one aspect of the invention, the thermoplastic polyolefin is selected from polypropylene homopolymer, polypropylene copolymers, and blends thereof. The homopolymer may be atactic polypropylene, isotactic polypropylene, syndiotactic polypropylene and blends thereof. The copolymer can be a random copolymer, a statistical copolymer, a block copolymer, and blends thereof. In particular, the inventive nanocomposite described herein may include impact copolymers, elastomers and plastomers, any of which may be physical blends or in situ blends with the polypropylene and or polybutene. The method of making the polypropylene or polybutene can be by slurry, solution, gas phase or other suitable processes, and by using catalyst systems appropriate for the polymerization of polyolefins, such as Ziegler-Natta catalysts, metallocene catalysts, other appropriate catalyst systems or combinations thereof. In an embodiment the propylene polymers and or the butene polymers are made by the catalysts, activators and processes described in U.S. Pat. Nos. 6,342,566, 6,384,142, WO 03/040201, WO 97/19991 and U.S. Pat. No. 5,741,563. Likewise the impact copolymers may be prepared by the process described in U.S. Pat. Nos. 6,342,566, 6,384,142. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al., *Selectivity in Propene Polymerization with Metallocene Catalysts,* 100 CHEM. REv. 1253-1345 (2000); and I, II METALLOCENE-BASED POLYOLEFINS (Wiley & Sons 2000).

Propylene homopolymers and copolymers useful in embodiments of this invention typically have:

1. an Mw of 30,000 to 2,000,000 g/mol, or 50,000 to 1,000,000, or 90,000 to 500,000, as measured by GPC as described below in the test methods; and/or
2. an Mw/Mn of 1 to 40, or 1.6 to 20, or 1.8 to 10, or 1.8 to 3 as measured by GPC as described below in the test methods; and/or
3. a Tm (second melt) of 30 to 200° C., or 30 to 185° C., or 50 to 175° C., or 60 to 170° C. as measured by the DSC method described below in the test methods; and/or
4. a crystallinity of 5 to 80%°, or 10 to 70%, or 20 to 60% as measured by the DSC method described below in the test methods; and/or
5. a glass transition temperature (Tg) of −40° C. to 20° C., or −20° C. to 10° C., or −10° C. to 5° C. as measured by the DMTA method described below in the test methods; and/or
6. a heat of fusion (Hf) of 180 J/g or less, or 20 to 150 J/g, or 40 to 120 J/g as measured by the DSC method described below in the test methods; and/or
7. a crystallization temperature (Tc) of 15 to 120° C., or 20 to 115° C., or 25 to 110° C., or 60 to 145° C., as measured by the method described below in the test methods; and/or
8. a heat deflection temperature of 45 to 140° C., or 60 to 135° C., or 75 to 125° C. as measured by the method described below in the test methods; and/or
9. a Rockwell hardness (R scale) of 25 or more, or 40 or more, or 60 or more, or 80 or more, or 100 or more, or from 25 to 125; and/or
10. a percent crystallinity of at least 30%, or at least 40%, alternatively at least 50%, as measured by the method described below in the test methods; and/or
11. a percent amorphous content of at least 50%, alternatively at least 60%, alternatively at least 70%, or between 50 and 95%, or 70% or less, or 60% or less, or 50% or less as determined by subtracting the percent crystallinity from 100.

The propylene homopolymer or propylene copolymer useful in the present invention may have some level of isotacticity. Thus, in one embodiment, a polyolefin comprising isotactic polypropylene is a useful polymer in embodiments of the invention, and similarly, highly isotactic polypropylene is useful in another embodiment. As used herein, "isotactic" is defined as having at least 10% isotactic pentads according to analysis by $^{13}C$-NMR as described in the test methods below. As used herein, "highly isotactic" is defined as having at least 60% isotactic pentads according to analysis by $^{13}C$-NMR. In an alternate embodiment, a polypropylene homopolymer having at least 85% isotacticity is the polyolefin, and at least 90% isotacticity in yet another embodiment.

In another embodiment, a propylene homopolymer having at least 85% syndiotacticity is the polyolefin, and at least 90% syndiotacticity in yet another embodiment. As used herein, "syndiotactic" is defined as having at least 10% syndiotactic pentads according to analysis by $^{13}C$-NMR as described in the test methods below. As used herein, "highly syndiotactic" is defined as having at least 60% syndiotactic pentads according to analysis by $^{13}C$-NMR.

In another embodiment the propylene homoploymer may be isotactic, highly isotactic, syndiotactic, highly syndiotactic, atactic or combinations thereof. Atactic polypropylene is defined to be less than 10% isotactic or syndiotactic pentads. Atactic polypropylenes typically have an Mw of 20,000 up to 1,000,000. Among the propylene polymers that are useful in this invention are those sold under the tradenames ACHIEVE™ and ESCORENE™ by ExxonMobil Chemical Company of Houston, Tex.

In another embodiment of the invention, the thermoplastic polyolefin is a propylene copolymer, either random, or block, of propylene derived units and units selected from ethylene and $C_4$ to $C_{20}$ α-olefin derived units, typically from ethylene and $C_4$ to $C_{10}$ α-olefin derived units in another embodiment. The ethylene or $C_4$ to $C_{20}$ α-olefin derived units are present from 0.1 wt % to 50 wt % of the copolymer in one embodiment, and from 0.5 to 30 wt % in another embodiment, and from 1 to 15 wt % in yet another embodiment, and from 0.1 to 5 wt % in yet another embodiment, wherein a copolymer comprises ethylene and $C_4$ to $C_{20}$ α-olefin derived units in any combination of any upper wt % limit with any lower wt % limit described herein.

In another embodiment the polyolefin may be a propylene copolymer comprising propylene and one or more other monomers selected from the group consisting of ethylene and $C_4$ to $C_{20}$ linear, branched or cyclic monomers, and in some embodiments is a $C_4$ to $C_{12}$ linear or branched alpha-olefin, or butene, pentene, hexene, heptene, octene, nonene, decene, dodecene, 4-methyl-pentene-1, 3-methyl pentene-1, or 3,5,5-trimethyl-hexene-1. The monomers may be present at up to 50 weight %, or from 0 to 40 weight %, or from 0.5 to 30 weight %, or from 2 to 30 weight %, or from 5 to 20 weight %.

Linear alpha-olefins useful as comonomers for the propylene copolymers useful in this invention include $C_3$ to $C_8$ alpha-olefins, or 1-butene, 1-hexene, and 1-octene. Branched alpha-olefins include 4-methyl-1-pentene, 3-methyl-1-pentene, and 3,5,5-trimethyl-1-hexene, or 5-ethyl-1-nonene. Aromatic-group-containing monomers contain up to 30 carbon atoms. Suitable aromatic-group-containing monomers comprise at least one aromatic structure, or from one to three, or a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including $C_1$ to $C_{10}$ alkyl groups. Additionally two adjacent substitutions may be joined to form a ring structure. Aromatic-group-containing monomers contain at least one aromatic structure appended to a polymerizable olefinic moiety. Aromatic monomers include styrene, alpha-methylstyrene, para-alkylstyrenes, vinyltoluenes, vinylnaphthalene, allyl benzene, 4-phenyl-1-butene and indene.

Non aromatic cyclic group containing monomers are also contemplated. These monomers can contain up to 30 carbon atoms. Suitable non-aromatic cyclic group containing monomers may have at least one polymerizable olefinic group that is either pendant on the cyclic structure or is part of the cyclic structure. The cyclic structure may also be further substituted by one or more hydrocarbyl groups such as, $C_1$ to $C_{10}$ alkyl groups. Non-aromatic cyclic group containing monomers include vinylcyclohexane, vinylcyclohexene, vinylnorbornene, ethylidene norbornene, cyclopentadiene, cyclopentene, cyclohexene, vinyladamantane or cyclobutene.

Diolefin monomers useful in these propylene thermoplastic polyolefins include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). It is further contemplated that the diolefin monomers be selected from alpha, omega-diene monomers (i.e. di-vinyl monomers). Or the diolefin monomers are linear di-vinyl monomers, or those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, or 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In another embodiment, one or more dienes may be present in the polymer at up to 10 weight %, or at 0.00001 to 1.0 weight %, or 0.002 to 0.5 weight %, or 0.003 to 0.2 weight %, based upon the total weight of the composition. In some embodiments 500 ppm or less of diene is added to the polymerization, or 400 ppm or less, or 300 ppm or less. In other embodiments at least 50 ppm of diene is added to the polymerization, or 100 ppm or more, or 150 ppm or more. In another embodiment the propylene copolymer is a random copolymer, also known as an "RCP," comprising propylene and up to 20 mole % of ethylene or a $C_4$ to $C_{20}$ olefin.

In another embodiment, the thermoplastic polyolefin may be an impact copolymer (ICP) or block copolymer. A typical propylene impact copolymer contains at least two phases or components, e.g., a homopolymer component and a copolymer component. The impact copolymer may also comprise three phases such as a PP/EP/PE (polypropylene/ethylene propylene rubber/polyethylene) combination with the PP continuous and a dispersed phase with EP outside and PE inside the dispersed phase particles. These components are usually produced in a sequential polymerization process wherein the homopolymer produced in a first reactor is transferred to a second reactor where copolymer is produced and incorporated within the matrix of the homopolymer component. The copolymer component has rubbery characteristics and provides the desired impact resistance, whereas the homopolymer component provides overall stiffness.

Another feature of ICP's is the amount of amorphous polypropylene they contain. The ICP's contemplated herein are characterized as having low amorphous polypropylene, generally less than 3% by weight, or less than 2% by weight, or less than 1% by weight or there is no measurable amorphous polypropylene. Percent amorphous polypropylene is determined by the method described below in the test methods.

Impact copolymers may be a reactor blend (in situ blend) or a post reactor (ex-situ) blend. In one embodiment, a suitable impact copolymer comprises from 40% to 95% by weight Component A and from 5% to 60% by weight Component B based on the total weight of the impact copolymer; wherein Component A comprises propylene homopolymer or copolymer, the copolymer comprising 10% or less by weight ethylene, butene, hexene or octene comonomer; and wherein Component B comprises propylene copolymer, wherein the copolymer comprises from 5% to 70% by weight ethylene, butene, hexene and/or octene comonomer, and from 95% to 30% by weight propylene. In one embodiment of the impact copolymer, Component B consists essentially of propylene and from 30% to 65% by weight ethylene. In another embodiment, Component B comprises ethylene-propylene copolymers, ethylene-propylene-diene terpolymers, ethylene-acrylate copolymers, ethylene-vinyl acetate, styrene-butadiene copolymers, ethylene-acrylic ester copolymers, polybutadiene, polyisoprene, natural rubber, isobutylene, hydrocarbon resin (the hydrocarbon resin being characterized by a molecular weight less than 5000, a $T_g$ of 50 to 100° C. and a softening point, Ring and Ball, as measured by ASTM E-28, of less than 140° C.), rosin ester, and mixtures thereof. In another embodiment, Component B has a molecular weight distribution of less than 3.5. In yet another embodiment, Component B has a weight average molecular weight of at least 20,000. A useful impact copolymer is disclosed in, for example, U.S. Pat. Nos. 6,342,566 and 6,384,142.

A thermoplastic polyolefin useful in the present invention may be an elastic polymer with a moderate level of crystallinity due to stereoregular propylene sequences. The thermoplastic polyolefin may be: (A) a propylene homopolymer in which the stereoregularity is disrupted in some manner such as by regio-inversions; (B) a random propylene copolymer in which the propylene stereoregularity is disrupted at least in part by comonomers; or (C) a combination of (A) and (B).

In one embodiment, the thermoplastic polyolefin further includes a non-conjugated diene monomer to aid in vulcanization and other chemical modification of the blend composition. The amount of diene present in the thermoplastic polyolefin is less than 10% by weight, or less than 5% by weight. The diene may be any non-conjugated diene which is commonly used for the vulcanization of ethylene propylene rubbers including, but not limited to, ethylidene norbornene, vinyl norbornene, and dicyclopentadiene.

In one embodiment, the thermoplastic polyolefin is a random copolymer of propylene and at least one comonomer selected from ethylene, $C_4$-$C_{12}$ $\alpha$-olefins, and combinations thereof. In an embodiment, the copolymer includes ethylene-derived units in an amount ranging from a lower limit of 2%, 5%, 6%, 8%, or 10% by weight to an upper limit of 20%, 25%, or 28% by weight. This embodiment will also include propylene-derived units present in the copolymer in an amount ranging from a lower limit of 72%, 75%, or 80% by weight to an upper limit of 98%, 95%, 94%, 92%, or 90% by weight. These percentages by weight are based on the total weight of the propylene and ethylene-derived units; i.e., based on the sum of weight percent propylene-derived units and weight percent ethylene-derived units being 100%.

The ethylene composition of a thermoplastic polyolefin can be measured as follows. A thin homogeneous film is pressed at a temperature of 150° C. or greater, then mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585−111.987X+30.045 $X^2$, wherein X is the ratio of the peak height at 1155 $cm^{-1}$ and peak height at either 722 $cm^{-1}$ or 732 $cm^{-1}$, whichever is higher. The concentrations of other monomers in the polymer can also be measured using this method.

Comonomer content of discrete molecular weight ranges can be measured by Fourier Transform Infrared Spectroscopy (FTIR) in conjunction with samples collected by GPC. One such method is described in Wheeler and Willis, Applied Spectroscopy, 1993, vol. 47, pp. 1128-1130. Different but similar methods are equally functional for this purpose and well known to those skilled in the art. Comonomer content and sequence distribution of the polymers can be measured by $^{13}C$ nuclear magnetic resonance ($^{13}C$ NMR), and such method is well known to those skilled in the art.

In one embodiment, the thermoplastic polyolefin is a random propylene copolymer (RCP) having a narrow composition distribution. In another embodiment, the thermoplastic polyolefin is a random propylene copolymer having a narrow composition distribution and a melting point of from 25° C. to 110° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intramolecular composition distribution (i.e., randomness) of the copolymer may be determined by $^{13}C$ NMR, which locates the comonomer residues in relation to the neighboring propylene residues. The intermolecular composition distribution of the copolymer is determined by thermal fractionation in a solvent. A typical solvent is a saturated hydrocarbon such as hexane or heptane. The thermal fractionation procedure is described below. Typically, approximately 75% by weight, or 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), or 10% (relative), of the average weight % comonomer of the copolymer. The copolymer has a narrow composition distribution if it meets the fractionation test described above. To produce a copolymer having the desired randomness and narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

The crystallinity of the thermoplastic polyolefin may be expressed in terms of heat of fusion. Embodiments of the present invention include polymers having a heat of fusion, as determined by DSC, ranging from a lower limit of 1.0 J/g, or 3.0 J/g, to an upper limit of 50 J/g, or 10 J/g.

The crystallinity of the thermoplastic polyolefin may also be expressed in terms of crystallinity percent. The thermal energy for the highest order of polypropylene is estimated at 189 J/g. That is, 100% crystallinity is equal to 189 J/g. Therefore, according to the aforementioned heats of fusion, the polymer has a polypropylene crystallinity within the range having an upper limit of 65%, 40%, 30%, 25%, or 20%, and a lower limit of 1%, 3%, 5%, 7%, or 8%.

The level of crystallinity is also reflected in the melting point. The term “melting point,” as used herein, is the highest peak highest meaning the largest amount of polymer being reflected as opposed to the peak occurring at the highest temperature among principal and secondary melting peaks as determined by DSC, discussed above. In one embodiment of the present invention, the polymer has a single melting point. Typically, a sample of propylene copolymer will show secondary melting peaks adjacent to the principal peak, which are considered together as a single melting point. The highest of these peaks is considered the melting point. The polymer has a melting point by DSC ranging from an upper limit of 110° C., 105° C., 90° C., 80° C., or 70° C., to a lower limit of 0° C., 20° C., 30° C., 35° C., 40° C., or 45° C.

The thermoplastic polyolefin used in embodiments of the present invention can have a tacticity index (m/r) ranging from a lower limit of 4 or 6 to an upper limit of 8, 10, or 12. The tacticity index, expressed herein as “m/r”, is determined by $^{13}C$ nuclear magnetic resonance (NMR). The tacticity index m/r is calculated as defined in H. N. Cheng, Macromolecules, 17, 1950 (1984). The designation “m” or “r” describes the stereochemistry of pairs of contiguous propylene groups, “m” referring to meso and “r” to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one embodiment, the thermoplastic polyolefin has isotactic stereoregular propylene crystallinity. The term “stereoregular” as used herein means that the predominant number, i.e. greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl groups is the same, either meso or racemic.

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}C$ NMR spectrum of the propylene copolymer and the following formula:

$$\text{mm Fraction} = \frac{PPP(\text{mm})}{PPP(\text{mm}) + PPP(mr) + PPP(rr)}$$

where PPP(mm), PPP(mr) and PPP(rr) denote peak areas derived from the methyl groups of the second units in the following three propylene unit chains consisting of head-to-tail bonds: (VII)

PPP (mm):

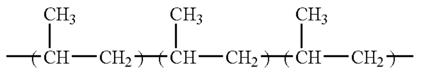

PPP (mr):

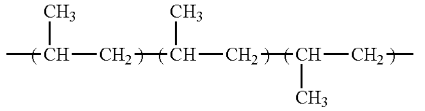

PPP (rr):

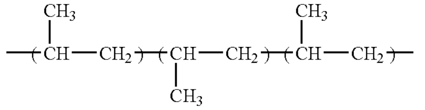

The $^{13}C$ NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The thermoplastic polyolefins of embodiments of the present invention have a triad tacticity of three propylene units, as measured by $^{13}C$ NMR, of 75% or greater, 80% or greater, 82% or greater, 85% or greater, or 90% or greater. In embodiments of the present invention, the thermoplastic polyolefin has a melt index (MI) of 20 dg/min or less, 7 dg/min or less, 5 dg/min or less, or 2 dg/min or less, or less than 2 dg/min. The determination of the MI of the polymer is according to ASTM D1238 (190° C., 2.16 kg). In this version of the method a portion of the sample extruded during the test was collected and weighed. This is commonly referred to as the modification 1 of the experimental procedure. The sample analysis is conducted at 190° C. with a 1 minute preheat on the sample to provide a steady temperature for the duration of the experiment.

Optional Functionalized Thermoplastic Polyolefin

The nanocomposites of embodiments of our invention optionally further comprise thermoplastic polyolefins that may be functionalized with functionality that is not considered stabilization functionality, hereinafter "non-stabilization functionalized thermoplastic polyolefins." Such non-stabilizing functionality may be selected from one or more of maleic anhydride, himic anhydride, succinic anhydride, acrylic acid, methacrylic acid, methyl acrylate, ethyl acrylate, butyl acrylate or combinations thereof. Such non-stabilizing functionality may be converted to stabilization functionality by methods discussed herein, but as added to an embodiment comprising a stabilization functionalized thermoplastic polyolefin and an organo-clay, the non-stabilizing functionalized thermoplastic polyolefin will be considered to be substantially devoid of such stabilizing functionality. By substantially devoid we intend $\leqq$0.001 weight %, or $\leqq$0.001 weight %, stabilization functionality being present in the non-stabilization functionalized thermoplastic polyolefin based upon the weight of the thermoplastic polyolefin, of one or more stabilization functionality is present in the non-stabilization functionalized thermoplastic polyolefin. If present in the nanocomposite, the non-stabilization functionalized thermoplastic polyolefin may be present in the range of from $\geqq$0.1, or $\geqq$0.5, or $\geqq$1, or $\geqq$2, or $\geqq$3, or $\geqq$4, or $\geqq$5, or $\geqq$7, or $\geqq$9, or $\geqq$10, or $\geqq$12, or $\geqq$15, or $\geqq$20 and $\leqq$50 or $\leqq$45, or $\leqq$40, or $\leqq$35, or $\leqq$30, or $\leqq$20, or $\leqq$15, or $\leqq$10 weight percent, based on the total weight of the nanocomposite. In yet another embodiment, a desirable range may be any combination of any upper limit with any lower limit.

Optional Elastomers and/or Plastomers

The term "elastomer", as used herein, refers to any polymer or composition of polymers consistent with the ASTM D1566 definition. The term "elastomer" may be used interchangeably with the term "rubber", as used herein. Copolymers of ethylene, and/or propylene and $C_1$-$C_{20}$ olefins derived units such as EP (ethylene propylene rubber) and/or EPDM (ethylene propylene diene monomer rubber) are also contemplated as optional elastomeric components in the nanocomposites of embodiments of our invention. Examples of comonomers in making these copolymers are ethylidene norbornene, vinyl norbornene, dicyclopentadiene, 1-4 hexadiene or dicyclopentadiene. These elastomers are described in Rubber Technology 260-283 (1995). Suitable ethylene-propylene rubbers or plastomers are commercially available as EXACT® and VISTALON® (ExxonMobil Chemical Company, Houston Tex.). Polyethylene plastomers are formed using well known single-site metallocene catalyst technology, which permits control of comonomer which may be incorporated into the polyethylene polymer and of molecular weight distribution. The plastomers are homopolymers of ethylene, or copolymers of ethylene with higher alpha-olefins having from 3 to 10 carbon atoms such as 1-butene, 1-hexene and 1-octene. The plastomers are commercially available from Dow Plastics, Dow U.S.A., Midland, Mich., under the trademark ENGAGE, especially ENGAGE EG8100 (an ethylene/1-octene copolymer). The ENGAGE plastomers have a density range of 0.865 to 0.889 g/cc and a peak melting point range of 120° F. to 185° F. Suitable plastomers also are available from ExxonMobil Chemical, under the trademark EXACT. The EXACT plastomers have similar density and peak melting point ranges as defined for the Dow plastomers.

The optional elastomer and/or plastomer may be metallocene produced plastomers. The plastomers are resins with a density ranging from 0.86 to 0.912 g/cc, or from 0.87 to 0.91 g/cc, and a melt index as $I_2$ of from 0.5 to 8 g/10 min., or from 1 to 5 g/10 min. While plastomers are contemplated, other types of ultra low density polyethylene (ULDPE) or VLDPE (made from any number of different catalyst types) or polyisobutylene, or atactic polypropylene are also contemplated. These very low density materials may be blended with any of the other components described herein.

The term "plastomer" as used herein refers generally to a class of ethylene based polymers with, Mw, greater than 20,000. Plastomers have an ethylene crystallinity between linear low density plastics and very low density polyethylenes and ethylene/alpha-olefin elastomers.

Preferred elastomers and plastomers useful herein may comprise polyenes. Typically, the polyene utilized has in the range of 3 to 20 carbon atoms, or in the range of 4 to 20 carbon atoms, or in the range of 4 to 15 carbon atoms. In one embodiment, the polyene is a diene that has in the range of 3 to 20 carbon atoms. Or the diene is a straight chain, branched chain or cyclic hydrocarbon diene having from 4 to 20 carbon atoms, or from 4 to 15 carbon atoms, or in the range of 6 to 15 carbon atoms. Or the diene is a nonconjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene. Among the dienes are 1,4-hexadiene, 5-ethylidene-2-norbornene, 5-vinyllidene-2-norbornene, 5-methylene-2-norbornene or dicyclopentadiene.

Elastomers suitable for use in the present invention as optional elastomers comprise $C_2$ to $C_{10}$ olefin derived units. As used herein, the term "olefin" includes "isoolefins" such as, for example, isobutylene, as well as "multiolefins" such as, for example, isoprene. The optional elastomer may also comprise monomer units having phenyl groups pendant to the elastomer backbone, the phenyl groups either substituted or not. Or the elastomer also comprises styrenic derived units selected from styrenes and substituted styrenes, non-limiting examples of which include a-methylstyrene, o-(ortho), m-(meta), and p (para)-methylstyrene, o-, m-, or p-tert-butylstyrene.

In one embodiment of the invention, the optional elastomer is a random copolymer of units selected from $C_2$ to $C_{10}$ olefin derived units (hereinafter, ethylene or "$C_2$" is referred to as an olefin derived unit) and styrenic derived unit such as, for example p-alkylstyrene derived units; wherein the p-alkylstyrene derived units are p-methylstyrene containing at least 80%, or at least 90% by weight of the p-isomer. In another embodiment of the invention, the elastomer is a random copolymer of a $C_4$ to $C_7$ isoolefin, such as isobutylene, and a styrenic monomer, such as a p-alkylstyrene comonomer, or p-methylstyrene containing at least 80%, or at least 90% by weight of the p-isomer. In yet another embodiment, the elastomer is a copolymer of an isoolefin such as isobutylene and a multiolefin such as isoprene, or "butyl" rubber.

In one embodiment of the invention, the optional elastomer may be a copolymer of styrenic derived units and/or substituted styrenic derived units, and olefin derived units as described above. The styrene derived units are present from 3 wt % to 20 wt % based on the total weight of the polymer in one embodiment, from 5 wt % to 12 wt % in another embodiment, from 5 wt % to 15 wt % in yet another embodiment, and from 8 wt % to 13 wt % in yet another embodiment, wherein a desirable range of styrene derived unit may include any upper wt % limit with any lower wt % limit described herein. The olefin is present in the optional elastomer in a range of from 70 wt % to 99.5 wt % by weight of the elastomer in one embodiment, and 85 wt % to 99.5 wt % in another embodiment. Suitable olefins are selected from $C_2$ to $C_{10}$ olefins, non-limiting examples of which include ethylene, propene, 1-butene, isobutylene (an isoolefin), 1-hexene, 1-octene, cyclopentadiene (a multiolefin) and isoprene (a multiolefin). For example, one embodiment of a suitable optional elastomer for nanocomposites of the invention may be a copolymer or terpolymer of any one or two of these monomers with a styrenic monomer such as, for example, α-methylstyrene, o-methylstyrene, m-methylstyrene, and p-methylstyrene monomers.

Non-limiting examples of optional elastomers that are suitable for the nanocomposite of the invention include any one or a mixture of natural rubber, poly(isobutylene-co-isoprene), polybutadiene, poly(styrene-co-butadiene), poly(isoprene-co-butadiene), poly(styrene-isoprene-butadiene), poly(isoprene-isobutylene-alkylstyrene), star-branched polyisobutylene rubber, poly(isobutylene-co-p-methylstyrene), ethylene-propylene-alkylstyrene rubber, ethylene-propylene-styrene rubber, wherein reference to an "alkyl" includes any $C_1$ to $C_{10}$ straight or branched chain alkyl.

In one embodiment of the invention, the optional elastomer suitable for the nanocomposite is a non-halogenated elastomer, meaning that the elastomer has not been subjected to a halogenation process, or otherwise comprise halogen moieties.

An example of a suitable optional elastomer for use in the present invention is poly(isobutylene-co-p-methylstyrene), or "XP-500" (ExxonMobil Chemical Company, Houston Tex.). These isoolefin copolymers, their method of preparation and cure are more particularly disclosed in U.S. Pat. No. 5,162,445. These elastomers have a substantially homogeneous compositional distribution such that at least 95% by weight of the polymer has a p-alkylstyrene content within 10% of the average p-alkylstyrene content of the polymer. Copolymers may also be characterized by a molecular weight distribution (Mw/Mn) of between 2 and 20 in one embodiment, and less than 10 in another embodiment, and less than 5 in another embodiment, and less than 2.5 in yet another embodiment, and greater than 2 in yet another embodiment; or a viscosity average molecular weight in the range of from 200,000 up to 2,000,000, or a number average molecular weight in the range of from 25,000 to 750,000 as determined by gel permeation chromatography.

The "elastomer", as described herein, may also comprise a composition of one or more of the same elastomer having differing molecular weights to yield a composition having a bimodal molecular weight distribution. This bimodal distribution can be achieved by, for example, having a low molecular weight component in the elastomer. This can be accomplished by physically blending two different MW polymers together, or by in situ reactor blending. In one embodiment, the elastomer has a low molecular weight (weight average molecular weight) component of from 5,000 MW to 80,000 MW in one embodiment, and from 10,000 MW to 60,000 MW in another embodiment; the low molecular weight component comprising from 5 to 40 wt % of the composition in one embodiment, and from 10 to 30 wt % of the composition in another embodiment. In an embodiment comprising poly(isobutylene-co-p-methylstyrene) as the elastomer, the p-methylstyrene derived units are present from 3 wt % to 15 wt % based on the total weight of the polymer, and from 5 wt % to 12 wt % in another embodiment, and from 8 wt % to 13 wt % in yet another embodiment, wherein a desirable range of p-methylstyrene may include any upper wt % limit with any lower wt % limit described herein. The isobutylene derived units are present in the elastomer in a range from 70 to 99.5 wt % by weight of the elastomer in one embodiment, and 85 to 99.5 wt % in another embodiment.

In another embodiment, the optional elastomer suitable for use in the nanocomposite of the invention is a copolymer of an isomonoolefin (or isoolefin) and a multiolefin, or a "butyl" rubber. In one embodiment of the invention, the optional elastomer is a copolymer of a $C_4$ to $C_6$ isoolefin and a multiolefin. In another embodiment, the elastomer is a blend of a polydiene or block copolymer, and a copolymer of a $C_4$ to $C_6$ isoolefin and a conjugated, or a "star-branched" butyl polymer. The butyl elastomer useful in the present invention can thus be described as comprising $C_4$ to $C_7$ isoolefin derived units and multiolefin derived units, and includes both "butyl rubber" and so called "star-branched" butyl rubber. As used herein, "butyl rubber" refers to both butyl rubber and so-called "star-branched" butyl rubber, described below. The olefin polymerization feeds employed in producing butyl rubber are those olefinic compounds conventionally used in the preparation of butyl-type rubber polymers. Butyl polymers may be prepared by reacting a comonomer mixture, the mixture having at least (1) a $C_4$ to $C_6$ isoolefin monomer component such as isobutylene with (2) a multiolefin, or conjugated diene, monomer component. The isoolefin is in a range from 70 wt % to 99.5 wt % by weight of the total comonomer mixture in one embodiment, and 85 wt % to 99.5 wt % in another embodiment. The multiolefin component in one embodiment is present in the comonomer mixture from 30 to 0.5 wt % in one embodiment, and from 15 wt % to 0.5 wt % in another embodiment. In yet another embodiment, from 8 wt % to 0.5 wt % of the comonomer mixture is multiolefin. Suitable isoolefins include $C_4$ to $C_7$ compounds such as isobutylene, isobutene, 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of a butyl rubber suitable for use in the invention comprises from 92 wt % to 99.5 wt % of isobutylene and from 0.5 wt % to 8 wt % isoprene, and from 95 wt % to 99.5 wt % isobutylene and 0.5 wt % to 5.0 wt % isoprene in yet another embodiment.

The star-branched butyl rubber is a composition of a butyl rubber, either halogenated or not, and a polydiene or block copolymer, either halogenated or not. The polydienes/block copolymer, or branching agents (hereinafter "polydienes"), are typically cationically reactive and are present during the polymerization of the butyl rubber, or can be blended with the butyl or butyl rubber to form the star-branched butyl rubber. More particularly, star-branched butyl rubber is typically a composition of the butyl and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, greater than 0.3 wt % in one embodiment, and from 0.3 wt % to 3 wt % in another embodiment, and from 0.4 wt % to 2.7 wt % in yet another embodiment.

A secondary rubber, or "general purpose rubber" component may be present in compositions and end use articles of the present invention. These rubbers may be blended by any suitable means with the other ingredients of the nanocomposite. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylenediene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

An embodiment of the secondary optional rubber component present is natural rubber. Natural rubbers are described in detail by *Subramaniam* in Rubber Technology 179-208 (Maurice Morton, ed., Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, or from 40 to 65. The Mooney viscosity test referred to herein is in accordance with ASTM D-1646.

Polybutadiene (BR) rubber is another optional secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207.

Rubbers of ethylene and propylene derived units such as EPM and EPDM are also suitable as optional secondary rubbers. Examples of suitable comonomers in making EPDM are ethylidene norbornene, 1,4-hexadiene, dicyclopentadiene, as well as others. These rubbers are described in Rubber Technology 260-283 (1995). A suitable ethylene-propylene rubber is commercially available as VISTALON™ (ExxonMobil Chemical Company, Houston Tex.).

In another embodiment, the optional secondary rubber is a halogenated rubber as part of the terpolymer composition. The halogenated butyl rubber is brominated butyl rubber, and in another embodiment is chlorinated butyl rubber.

General properties and processing of halogenated butyl rubbers are described in THE VANDERBILT RUBBER HANDBOOK 105-122 (Robert F. Ohm ed., R. T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The optional secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and 4,395,506; halogenated isoprene and halogenated isobutylene copolymers, polychloroprene, and the like, and mixtures of any of the above. Some embodiments of the halogenated rubber component are also described in U.S. Pat. No. 4,703,091 and 4,632,963.

In one embodiment of the invention, a so called semi-crystalline copolymer ("SCC") is present as the optional secondary "rubber" component. Semi-crystalline copolymers are described in WO 00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The optional elastomeric component may be present in the nanocomposite in a range of 0 or ≧1, or ≧2, or ≧3, or ≧4, or ≧5, or ≧6, or ≧7, or ≧8, or ≧9, or ≧10, or ≧15, or ≧20, or ≧25, or ≧30 and ≦50, or ≦40, or ≦30, or ≦25, or 20, or ≦15, or ≦10, or ≦9, or ≦8, or ≦7, or ≦6, or ≦5, or ≦4, or ≦3 wt. %, each based on the total weight of the nanocomposite. An embodiment may include any combination of any upper limit and any lower limit.

The optional elastomer or plastomer component will be substantially free of functionality. By substantially free we intend that ≦0.01, or ≦0.001 or ≦0.0001 weight percent of a functional group will make up the optional elastomer or plastomer.

Optional Fillers

Nanocomposites of embodiments of our invention may comprise one or more filler components such as, for example, calcium carbonate, silica, talc, titanium dioxide, and carbon black, in addition to the at least one organo-clay. Optional fillers may be present in the nanocomposite in the range of ≧0.001, or ≧0.01, or ≧0.1, or ≧1 wt % and ≦50, or ≦30, or ≦20 or ≦15 or ≦10 wt %, based on the total weight of the nanocomposite, and an embodiment may include any combination of any upper limit and any lower limit.

Alternate Embodiments

Additional embodiments contemplated include: a nanocomposite, comprising: organo-clay, and at least one first thermoplastic polyolefin comprising stabilization functionality, the stabilization functionality covalently bonded to the at least one first thermoplastic polyolefin. Wherein the organo-clay comprises one or more of ammonium, primary alkylammonium, secondary alkylammonium, tertiary alkylammonium quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. Wherein the organo-clay is selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite or florine mica. Wherein the organo-clay is present in the nano-composite from 0.1-50 wt % of the nanocomposite. Wherein the stabilization functionality is selected from one or more of phenols, ketones, hindered amines, substituted phenols, substituted ketones, substituted hindered amines, or combinations thereof. Wherein the nanocomposite optionally further comprises at least one elastomeric ethylene-propylene copolymer. Wherein the at least one elastomeric ethylene-propylene copolymer is present in the nanocomposite from 1 to 70% of the nanocomposite. Wherein the nanocomposite optionally further comprises at least one non-functionalized thermoplastic polyolefin. Wherein the stabilization functionality is present in the at least one first stabilization functionalized thermoplastic, and the organo-clay is present in the nanocomposite, each in an effective amount to increase the heat aged failure of a molded sample of the nanocomposite by ≧10% compared to a reference nanocomposite made with a thermoplastic polyolefin containing functionality substantially free of covalently-bonded stabilization functionality. Wherein the stabilization functionality is present in the at least one first stabilization functionalized thermoplastic, and the organo-clay present in the nanocomposite, each in an effective amount to increase the heat aged failure of a molded sample of the nanocomposite by ≧10% compared to a reference nanocomposite made with a thermoplastic polyolefin containing functionality substantially free of covalently-bonded stabilization functionality. Wherein the stabilization functionality being present in the at least one stabilization functionalized thermoplastic polyolefin from ≧0.01 to ≦15 wt % based on the total weight of the at least one stabilization functionalized thermoplastic. Where the non-functionalized thermoplastic polyolefin is miscible with the at least one first stabilization functionalized thermoplastic polyolefin. Wherein the at least one non-functionalized thermoplastic polyolefin is present in the nanocomposite from ≧1 to ≦40 wt %, based on the total weight of the nanocomposite, and the organo-clay is present in the nanocomposite from ≧0.5 to ≦40 wt %, based on the total weight of the nanocomposite. Wherein both the at least one first stabilization functionalized thermoplastic polyolefin and the at least one non-functionalized thermoplastic polyolefin each comprise one of polypropylene or polyethylene. In another embodiment, a nanocomposite is contemplated, comprising: a) at least one first non-functionalized polypropylene present in the nanocomposite from ≧10 to ≦98 wt %, based on the total weight of the nanocomposite; b) at least one second polypropylene comprising stabilization functionality, the stabilization functionality selected from one or more of phenols, ketones, hindered amines, substituted phenols, substituted ketones, substituted hindered amines, or combinations thereof, and the stabilization functionality present in the stabilization functionalized polypropylene from ≧0.05 to ≦15 wt %, based on the total weight of the of the polypropylene comprising stabilization functionality, the at least one second polypropylene comprising stabilization functionality present in the nanocomposite from ≧10 to ≦90 wt. %, based on the total weight of the nanocomposite; c) an organo-clay wherein the organo-clay comprises one or more of hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion, distearyl ammonium ion, ammonium salt, pyridinium salt, sulfonium salt, phosphonium salt, or combinations thereof, wherein the organo-clay further comprising a clay selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite or florine mica, and wherein the organo-clay is present in the nanocomposite from ≧1 to ≦30 weight %, based on the total weight of the nanocomposite; and d) optionally further comprising one or more of an ethylene-propylene elastomeric copolymer or an isobutylene rubber present in the nanocomposite at ≧2 to ≦70 wt %, based on the total weight of the nanocomposite.

Test Methods

Thermal stability is measured by ASTM D3012-00. The secant flexural modulus is measured by ASTM D790A with a speed of 0.05 in/minute at 23° C.

Heat of Fusion

Thermodynamic heat of fusion data were determined by differential scanning calorimetry (DSC), the procedure for which is as follows. 6 to 10 mg of a sheet of the polymer pressed at approximately 200° C. to 230° C. is removed with a punch die. This sample is annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 175° C., and occurs between the temperatures of 0° C. and 200° C. The thermal output in joules is a measure of the heat of fusion. The melting point is recorded as the temperature of the greatest heat absorption within the range of melting of the sample.

Mw and Mn

Mw and Mn were measured by GPC (Gel Permeation Chromatography) on a Waters 150 gel permeation chromatograph equipped with a differential refractive index (DRI) detector and a Chromatix KMX-6 on line light scattering photometer. The system was used at 135° C. with 1,2,4-trichlorobenzene as the mobile phase. Shodex (Showa Denko America, Inc) polystyrene gel columns 802, 803, 804 and 805 were used. This technique is discussed in "Liquid Chromatography of Polymers and Related Materials III", J. Cazes editor, Marcel Dekker. 1981, p. 207, which is incorporated herein by reference. No corrections for column spreading were employed; however, data on generally accepted standards, e.g. National Bureau of Standards Polyethylene 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customized LALLS software in conjunction with the standard Gel Permeation package. Calculations involved in the characterization of polymers by $^{13}$CNMR follow the work of F. A. Bovey in "Polymer Conformation and Configuration" Academic Press, New York, 1969.

Melting Temperature (Tm) and Crystallization Temperature (Tc)

T melt and T crystallization are peak temperatures from Differential Scanning Calorimetry (DSC), run at 10° C./min, heating and cooling rates.

Percent Crystallinity (Enthalpy)

Percent Crystallinity (enthalpy) was derived from the enthalpy of fusion from DSC measurements. 164 J/g is taken from the literature as the enthalpy of fusion of fully crystalline isotactic polypropylene (B. Wunderlich, Macromolecular Physics, Vol. 3, Academic Press, 1980).

Tg

Differential Scanning Calorimetry (DSC, ASTM E-1356, at a heating rate of 5° C./minute) was used to measure $T_g$.

Tg Peak Obtained by DMTA

The DMTA on the injection molded samples are run on Polymer Laboratories Mark II instrument. Samples are run in uniaxial extension configuration from −100 to 160° C. at a heating rate of 2° C./minute and at 1 or 10 Hz frequency. The data plotted are analyzed for storage, loss modulus and tan delta.

Heat Deflection Temperature:

The heat deflection temperature (HDT) is measured according to ASTM D 648, and under a load of 66 psi, using equipment made by Ceast Corp.

Percent Crystallinity (Enthalpy)

Percent Crystallinity (enthalpy) was derived from the enthalpy of fusion from DSC measurements. 164 J/g is taken from the literature as the enthalpy of fusion of fully crystalline isotactic polypropylene (B. Wunderlich, Macromolecular Physics, Vol. 3, Academic Press, 1980).

Tacticity Measurement

Tacticity measurements were determined by $^{13}$C NMR as described in "Polymer Sequence Distributions", J. C. Randall, Academic Press, New York, (1986).

Dynamic Mechanical Thermal Analysis

The glass transition temperature ($T_g$) and storage modulus (E') are measured using dynamic mechanical thermal analysis (DMTA). This test provides information about the small-strain mechanical response (relaxation behavior) of a sample as a function of temperature over a temperature range that includes the glass transition region and the visco-elastic region prior to melting. Typically, samples are tested using a three point bending configuration (TA Instruments DMA 2980). A solid rectangular compression molded bar is placed on two fixed supports; a movable clamp applied a periodic deformation to the sample midpoint at a frequency of 1 Hz and an amplitude of 20 μm. The sample is initially cooled to −130° C. then heated to 60° C. at a heating rate of 3° C./min. In some cases, compression molded bars are tested using other deformation configurations, namely dual cantilever bending and tensile elongation (Rheometrics RSAII). The periodic deformation under these configurations is applied at a frequency of 1 Hz and strain amplitude of 0.05%. The sample is cooled to −130° C. and then heated to 60° C. at a rate of 2° C./min. The slight difference in heating rate does not influence the glass transition temperature measurements significantly.

The output of these DMTA experiments is the storage modulus (E') and loss modulus (E"). The storage modulus measures the elastic response or the ability of the material to store energy, and the loss modulus measures the viscous response or the ability of the material to dissipate energy. Tanδ is the ratio of E"/E' and gives a measure of the damping ability of the material. The beginning of the broad glass transition (β-relaxation) is identified as the extrapolated tangent to the Tanδ peak. In addition, the peak temperature and area under the peak are also measured to more fully characterize the transition from glassy to visco-elastic region.

Differential Scanning Calorimetry

Crystallization temperature ($T_c$) and melting temperature ($T_m$) are measured using Differential Scanning Calorimetry (DSC). This analysis is conducted using either a TA Instruments MDSC 2920 or a Perkin Elmer DSC7. Typically, 6 to 10 mg of molded polymer or plasticized polymer is sealed in an aluminum pan and loaded into the instrument at room temperature. Melting data (first heat) are acquired by heating the sample to at least 30° C. above its melting temperature at a heating rate of 10° C./min. This provides information on the melting behavior under as-molded conditions, which can be influenced by thermal history as well as any molded-in orientation or stresses. The sample is then held for 10 minutes at this temperature to destroy its thermal history. Crystallization data is acquired by cooling the sample from the melt to 25° C. at a cooling rate of 10° C./min. The sample is then held at 25° C. for 10 minutes, and finally heated at 10° C./min to acquire additional melting data (second heat). This provides information about the melting behavior after a controlled thermal history and free from potential molded-in orientation and stress effects. The endothermic melting transition (first and second heat) and exothermic crystallization transition are analyzed for onset of transition and peak temperature. The melting temperatures to be reported are the peak melting temperatures from the second heat unless otherwise indicated. For polymers displaying multiple peaks, the higher melting peak temperature is reported.

Areas under the curve are used to determine the heat of fusion ($\Delta H_f$) which can be used to calculate the degree of crystallinity. A value of 207 J/g is used as the equilibrium heat of fusion for 100% crystalline polypropylene (obtained from B. Wunderlich, "Thermal Analysis", Academic Press, Page 418, 1990). The percent crystallinity is calculated using the formula, [area under the curve (J/g)/207 (J/g)] *100.

Size-Exclusion Chromatography of Polymers

Molecular weight distribution is characterized using Size-Exclusion Chromatography (SEC). Molecular weight (weight-average molecular weight, Mw, and number-average molecular weight, Mn) are determined using a Waters 150 Size Exclusion Chromatograph (SEC) equipped with a differential refractive index detector (DRI), an online low-angle light scattering (LS) detector, and a viscometer (VIS). The details of the detector calibrations have been described elsewhere [Reference: T. Sun, P. Brant, R. R. Chance, and W. W. Graessley, Macromolecules, Volume 34, Number 19, 6812-6820, (2001)].

Three Polymer Laboratories PLgel 10 mm Mixed-B columns are used in series. The nominal flow rate is 0.5 $cm^3$/min, and the nominal injection volume is 300 μL. The various transfer lines, columns and differential refractometer (the DRI detector, used mainly to determine eluting solution concentrations) are contained in an oven maintained at 135° C.

The LS detector is a dual-angle light scattering photometer (Precision Detector Model 2040). Its flow cell, located in the SEC oven, uses a 690 nm diode laser light source and collects scattered light at two angles, 15° and 90°. Only the 15° output is used in these experiments. Its signal is sent to a data acquisition board (National Instruments) that accumulates readings at a rate of 16 per second. The lowest four readings are averaged, and then a proportional signal is sent to the SEC-LS-VIS computer. The LS detector is placed after the SEC columns, but before the viscometer.

The viscometer (Viscotek Corporation, Model 150R) consists of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer is calculated from their outputs. The viscometer is inside the SEC oven, positioned after the LS detector but before the DRI detector.

Solvent for the SEC experiment is prepared by dissolving 6 grams of butylated hydroxy toluene as an antioxidant in 4 liters of reagent grade 1,2,4 trichlorobenzene (TCB). The TCB mixture is then filtered through a 0.7 μm glass pre-filter and subsequently through a 0.1 μm Teflon® filter. There is an additional online 0.7 μm glass pre-filter/0.22 μm Teflon filter assembly between the high pressure pump and SEC columns. The TCB is then degassed with an online degasser (Phenomenex, Model DG-4000) before entering the SEC.

Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration ranges from 1.0 to 2.0 mg/ml, with lower concentrations being used for higher molecular weight samples.

Prior to running each sample the DRI detector and the injector are purged. Flow rate in the apparatus is then increased to 0.5 ml/minute, and the DRI is allowed to stabilize for 8-9 hours before injecting the first sample. The argon ion laser is turned on 1 to 1.5 hours before running samples by running the laser in idle mode for 20-30 minutes and then switching to full power in light regulation mode.

EXAMPLES

Reference 1: Epolene G 3015 (33 grams) was melted in a Brabender at 185° C. with a rotor speed of 100 rpm. After two minutes, Cloisite® 6A (16.5 grams) was added slowly and the melt was mixed for 10 minutes to afford clay master batch. Then, PP1043N (125 grams), clay master batch (44 grams) and IR 1010 (550 mg) were melt and mixed in a Brabender at 185° C. with a rotor speed of 90 rpm for 12 minutes. Product's 1% secant flexural modulus: 299 kpsi; Long term heat aging (oven) aging at 150° C.: 14 days to part failure.

Experiment 2: Epolene G3015 (42 grams) was melted in a Brabender at 185° C. with a rotor speed of 60 rpm. 4-(2-aminomethyl)phenol (1.5 gram) was slowly added and the reaction lasted for 30 minutes, to produce propylene with phenol grafted to polypropylene. The same experiment was repeated and samples collected. The modified propylene (33 grams) was melted in a Brabender at 185° C. with a rotor speed of 100 rpm. After two minutes, Cloisite 6A (16.5 grams) was added slowly and the melt was mixed for 10 minutes to produce a clay master batch. Then, PP1043N (125 grams), clay master batch (44 grams) and IR 1010 (550 mg) were melted and mixed in a Brabender at 185° C. with a rotor speed of 90 rpm for 12 minutes. Product's 1% secant flexural modulus: 296 kpsi; Long term heat aging (LTHA) (oven) aging at 150° C.: 26 days to part failure. Comparing to reference 1, although both nanocomposites were prepared under same conditions with same compositions, the nanocomposite using stabilization functionalized polypropylene has similar secant flexural modulus to and higher LTHA (85%) than that using Epolene G 3015, a thermoplastic polyolefin with non-stabilization functionality.

Experiment 3: Epolene G 3015 (40 grams) was dissolved in 300 mL of Xylene at 135° C. To the solution was added 4-(2-aminoethyl)phenol (3.0 grams). After the solution was stirred for 5 hours, it was poured into MeOH. The product was dried under vacuum at 120° C. to produce stabilization functionalized polypropylene. The stabilization functionalized propylene (33 grams) was melted in a Brabender at 185° C. with a rotor speed of 100 rpm. After two minutes, Cloisite 6A (16.5 grams) was added slowly and the melt was mixed for 10 minutes to produce a clay master batch. Then, PP1043N (125 grams), clay master batch (44 grams) and IR 1010 (550 mg) were melted and mixed in a Brabender at 185° C. with a rotor speed of 90 rpm for 12 minutes. Product's 1% secant flexural modulus: 290 kpsi; Long term heat aging (LTHA) oven aging at 150° C.: 20 days to failure. Comparing to reference 1, although both nanocomposites are prepared under same conditions with same compositions, the nanocomposite using stabilization functionalized polypropylene has similar secant flexural modulus to and higher LTHA (42%) than that using Epolene G 3015.

Experiment 4: Epolene G 3015 (42 grams) was melted in a Brabender at 185° C. with a rotor speed of 60 rpm. 4-aminophenol (1.5 gram) was slowly added and the reaction lasts for 15 minutes producing phenol grafted to polypropylene. The same experiment was repeated and all the samples were collected. The modified propylene (33 grams) was melt in a Brabender at 185° C. with a rotor speed of 100 rpm. After two minutes, Cloisite 6A (16.5 grams) was added slowly and the melt was mixed for 10 minutes to afford clay master batch. Then, PP1043N (125 grams), clay master batch (44 grams) and IR 1010 (550 mg) were melted and mixed in a Brabender at 185° C. with a rotor speed of 90 rpm for 12 minutes. Product's 1% sec flex modulus: 306 kpsi; Long term heat aging (LTHA) over oven aging at 150° C.: 21 days to failure. Comparing to reference 1, although both nanocomposites were prepared under same conditions with same compositions, the nanocomposite using stabilization functionalized polypropylene has similar secant flexural modulus to and higher LTHA (50%) than that using Epolene 3015.

Reference 5: Polybond 3200 (33 grams) was melted in a Brabender at 185° C. with a rotor speed of 100 rpm. After two minutes, Cloisite 6A (16.5 grams) was added slowly and the melt was mixed for 10 minutes to afford clay master batch. Then, PP1043N (125 grams), clay master batch (44 grams) and IR 1010 (550 mg) were melt and mixed in a Brabender at 185° C. with a rotor speed of 90 rpm for 12 minutes. Product's 1% secant flexural modulus: 282 kpsi; Long term heat aging over oven aging at 150° C.: 13 days to failure.

Experiment 6: Polybond 3200 (42 grams) was melted in a Brabender at 185° C. with a rotor speed of 60 rpm. 4-(2-aminomethyl)phenol (1.5 gram) was slowly added and the reaction lasted for 30 minutes producing phenol grafted to polypropylene. The same experiment was repeated for one more time and all the samples were collected. The stabilization functionalized propylene (33 grams) was melted in a Brabender at 185° C. with a rotor speed of 100 rpm. After two minutes, Cloisite 6A (16.5 grams) was added slowly and the melt was mixed for 10 minutes to afford clay master batch. Then, PP1043N (125 grams), clay master batch (44 grams) and IR 1010 (550 mg) were melted and mixed in a Brabender at 185° C. with a rotor speed of 90 rpm for 12 minutes. Product's 1% secant flexural modulus: 287 kpsi; Long term heat aging (LTHA) (oven) aging at 150° C.: 21 days to failure. Comparing to reference 5, although both nanocomposites are prepared under same conditions with same compositions, the nanocomposite using stabilization functionalized polypropylene has similar secant flexural modulus to and higher LTHA (62%) than that using Polybond 3200.

Reference 7: PP 1043N (89.0 grams), Exact 4033 (44.0 grams) and IR1010 (500 mg) were melted in a Brabender at 185° C. with a rotor speed of 90 rpm for 5 minutes. To the melt was added Epolene 3015 (28.0 grams) and Cloisite 6A (14.0 grams) and the melt was mixed for 12 minutes. Product's 1% secant flexural modulus: 197 kpsi; Long term heat aging (LTHA) oven aging at 150° C.: 14 days to failure.

Experiment 8: Epolene G 3015 (170 grams) was melted in a Brabender with a rotor speed of 90 rpm at 185° C. To the melt was added 4-(2-aminoethyl)phenol (6.0 grams) and the mixture reacted for 20 minutes producing the modified polypropylene. The product was taken out of Brabender. To the clean Brabender, PP 1043N (89.0 grams), Exact® 4033 (44.0 grams) and IR1010 (500 mg) were added and mixed at 185° C. with a rotor speed of 90 rpm for 5 minutes. To the melt was added the stabilization functionalized polypropylene (28.0 grams) and Cloisite 6A (14.0 grams) and the melt was mixed for 12 minutes. Product's 1% secant flexural modulus: 194 kpsi; Long term heat aging (LTHA) oven aging at 150° C.: 26 days to failure. Comparing to reference 7, although both nanocomposites are prepared under same conditions with same compositions, the nanocomposite using stabilization functionalized polypropylene has similar secant flexural modulus to and higher LTHA (100%) than that using Epolene 3015.

TABLE 1

Material Description

| Component | Description | Material Source |
| --- | --- | --- |
| Epolene ® G 3015 | Maleic anhydride functionalized polypropylene Acid Number 15, molecular weights Mw 47,000, Mn 24,800, viscosity 25,000 cP | Eastman Chemicals |
| Polybond ® 3200 | Maleic anhydride (MA) grafted polypropylene, MA content 1.0 weight % | Uniroyal Chemical |
| Cloisite ® 6A, | Montmorillonite clay treated with di-methyl di-hydrogenated tallow alkyl ammonia chloride, dry particle size, by volume, 10% less than 2 μ, 50% less than 6 μ, 90% less than 13 μ | Southern Clay |
| Exact ® 4033 | Ethylene-based plastomer, Melt Index 0.8 g/10 min., density 0.88 g/cm$^3$, Mooney Viscosity ML (1 + 4) 28, peak melting temperature 60° C. | ExxonMobil Chemical |

TABLE 1-continued

| Material Description | | |
| --- | --- | --- |
| Component | Description | Material Source |
| 4-(2-aminoethyl)phenol | | Aldrich Chemical |
| 4-aminophenol | | Aldrich Chemical |
| PP 1043N | Polypropylene homopolymer, MFR ASTM D 12385.25 g/10 min., density 0.9 g/cm$^3$, HDT @ 455 kPa, ASTM D 648 126° C. | ExxonMobil Chemical |
| Irganox ® 1010 | Phenolic primary antioxidant Pentaerythritol tetrakis(3-(3,5-di-tert-butyl-4-hydroxyphenyl)propionate) | Ciba Specialty Chemicals |

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A nanocomposite, comprising:

a) at least one first non-functionalized polypropylene present in the nanocomposite at from ≧10 to ≦98 wt %, based on the total weight of the nanocomposite, said first non-functionalized polypropylene having an Mw/Mn of 1.8 to 3;

b) at least one second polypropylene comprising stabilization functionality, said stabilization functionality selected from one or more of phenols, substituted phenols or combinations thereof, and said stabilization functionality being present in said stabilization functionalized polypropylene from ≧0.05 to ≦15 wt %, based on the total weight of said of the polypropylene comprising stabilization functionality, where the second polypropylene comprising stabilization functionality is present in said nanocomposite at from ≧10 to ≦90 wt. %, based on the total weight of the nanocomposite;

c) an organo-clay selected from one or mare of moatmorillonite, sodium montmorillonite, calcium montmorillonite, magnesium montmorillonite, nontronito, boidellite, volkonakoite, laponite, hectorite, saponite, sauconite, magadite, kenysite, sobockite, svindordite, stevensite, vermiculite, halloysite, aluininate oxides, hydrotalcite, illite, reotorite, tarosovite, ledikite or florine mica, and wherein said organo-clay is present in said nanocomposite from ≧1 or ≦30 weight %, based on the total weight of the nanocomposite, and where the nanoclay further comprises one or more of hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion, distearyl ammonium ion, ammonium salt, pyridinium salt, sulfonium salt, phosphonium salt; and d) optionally, an ethylene-propylene elastomeric copolymer or an isobutylene rubber present in the nanocomposite at ≧2 to ≦70 wt %, based on the total weight of the nanocomposite.

2. A fabricated article comprising the nanocomposite of claim 1.

3. An automotive part or an appliance part comprising the nanocomposite of claim 1.

4. The blend of claim 1 wherein the at least one stabilization functionalized thermoplastic polyolefin is selected from the group consisting of:

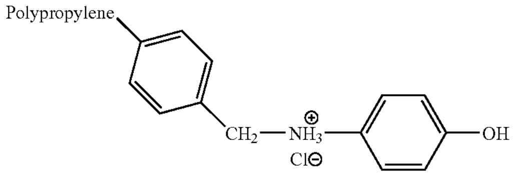

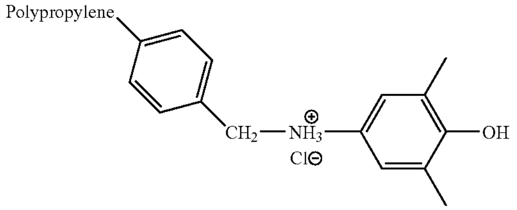

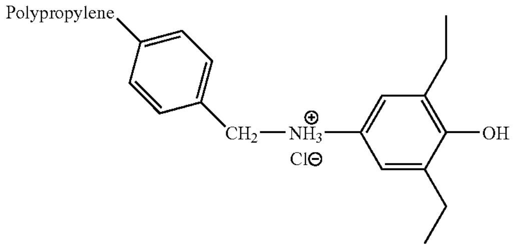

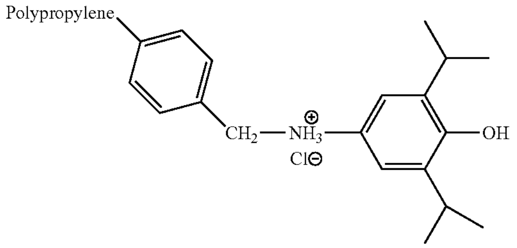

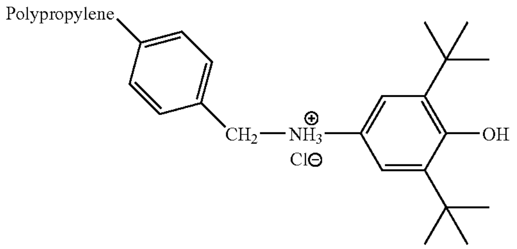

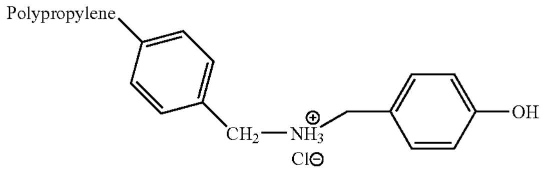

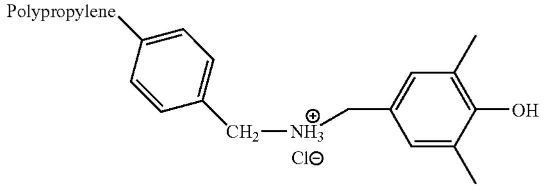

-continued
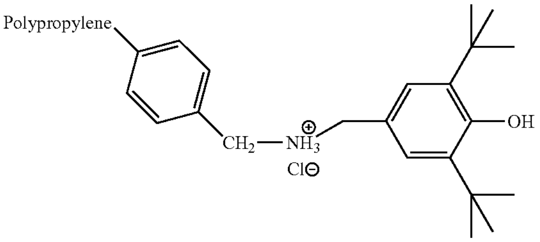
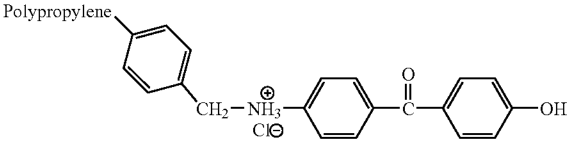
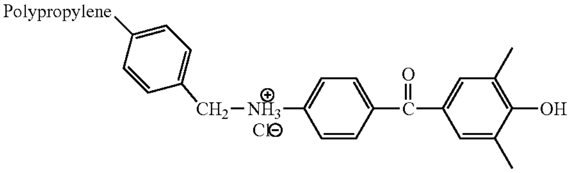
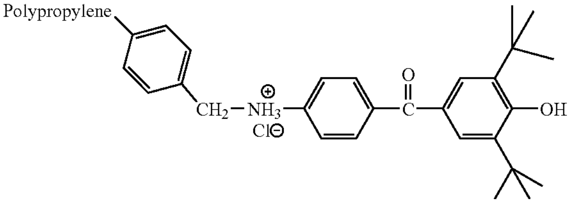
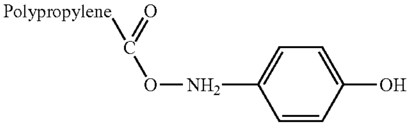
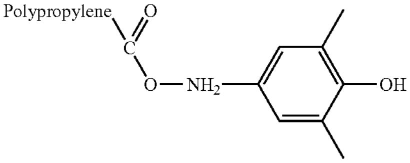
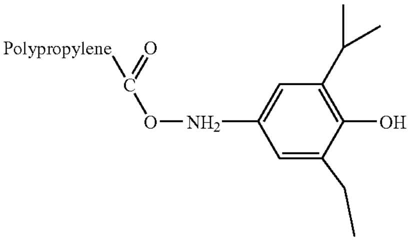
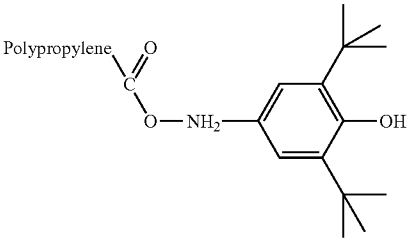
-continued
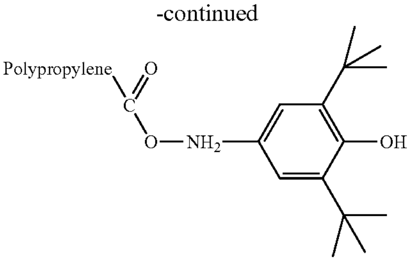
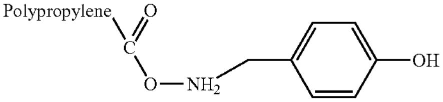
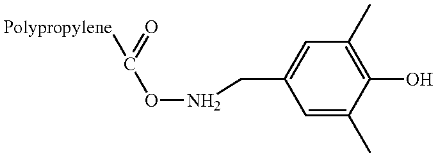
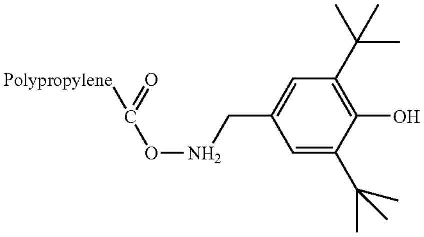
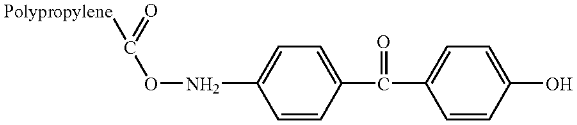
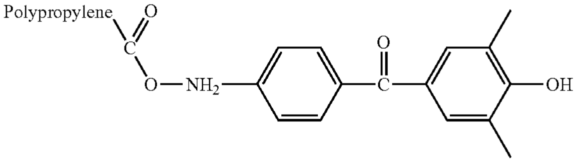
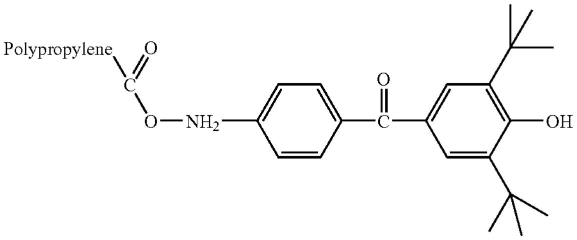
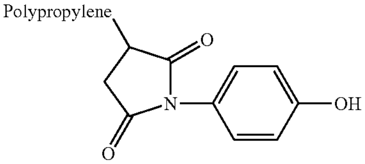
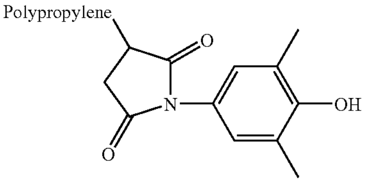

-continued
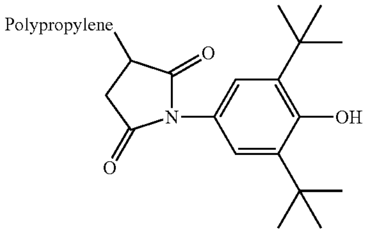
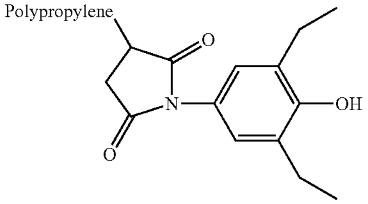
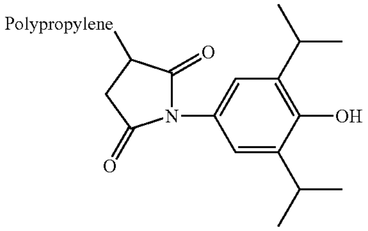
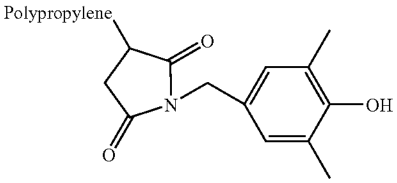
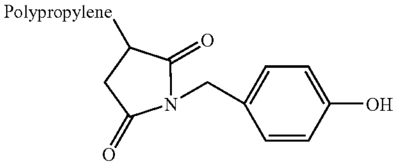
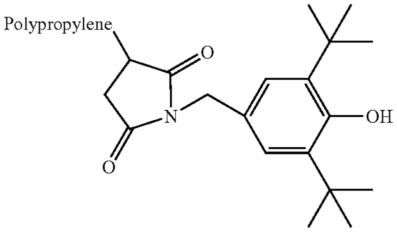
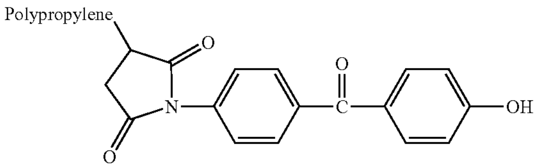
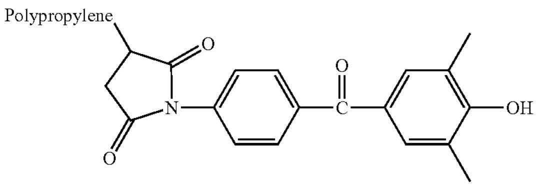
-continued
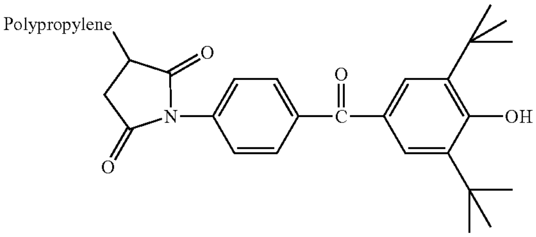
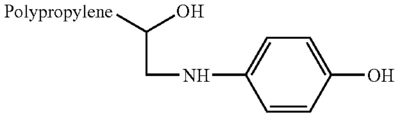
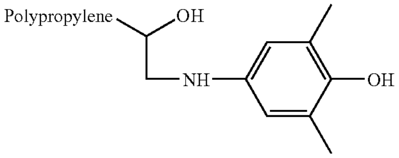
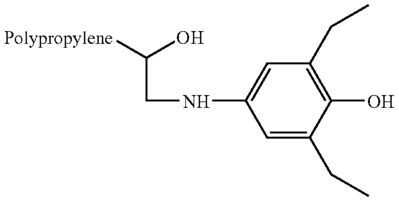
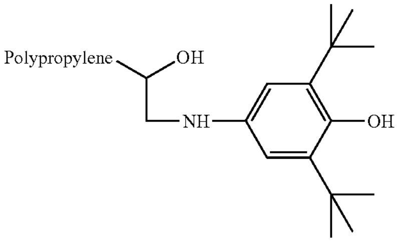
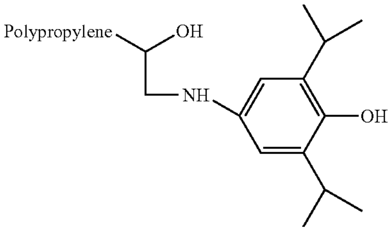
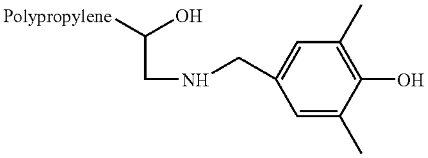
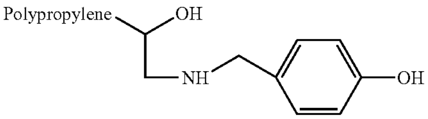
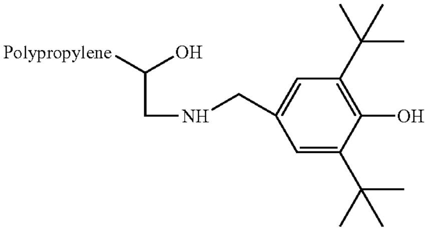

-continued
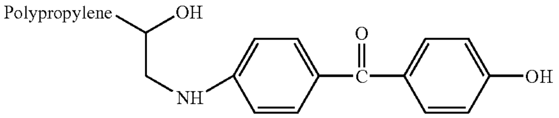
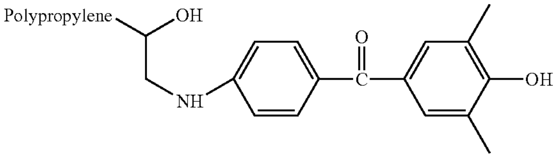
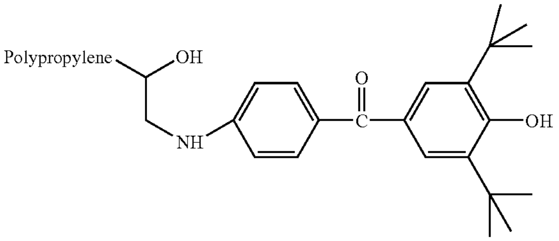
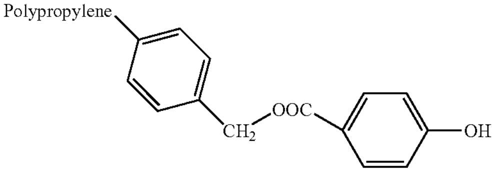
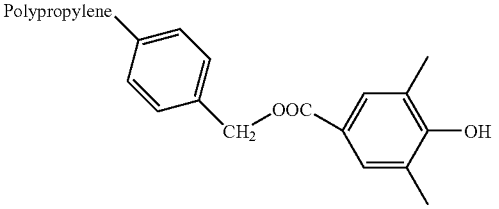
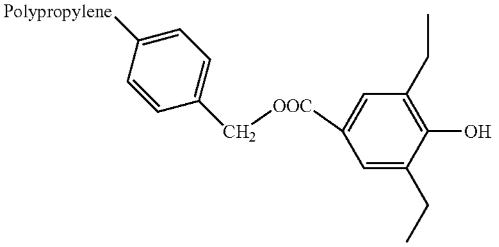
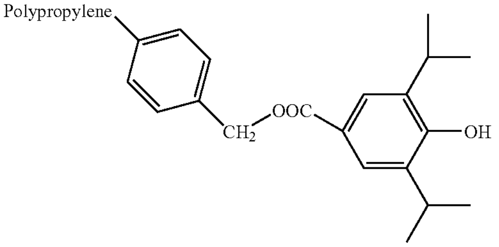
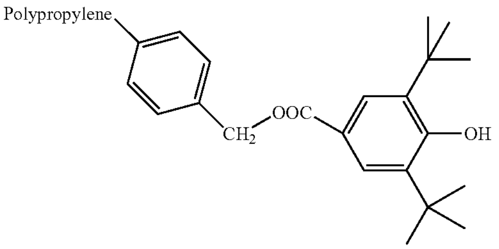
-continued
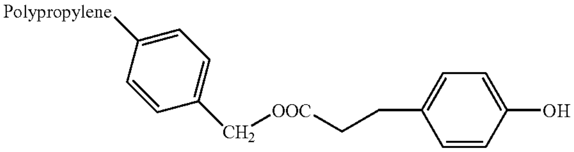
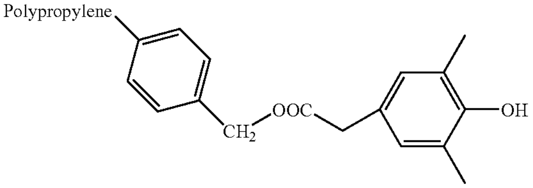
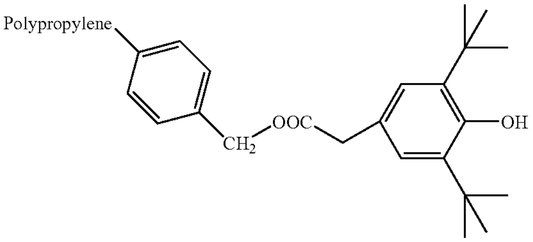
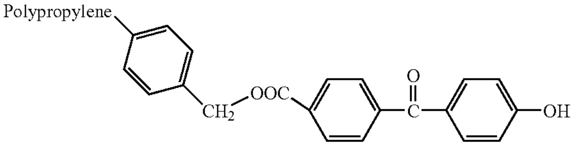
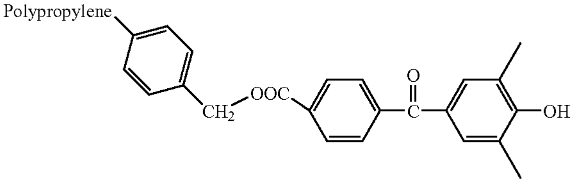
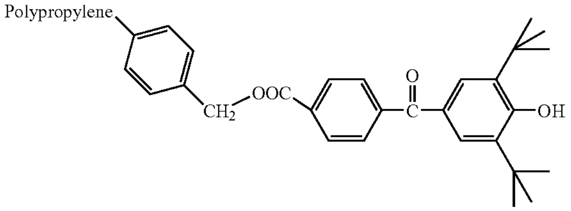
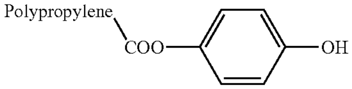
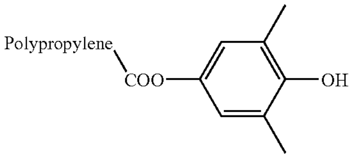
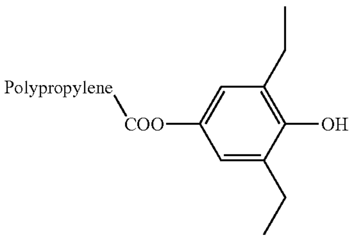

-continued
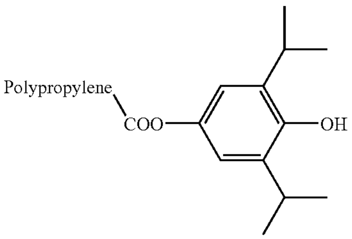
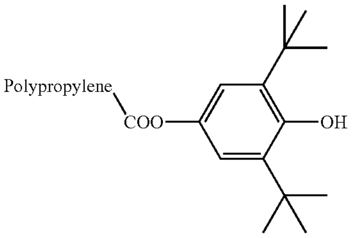
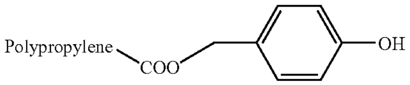
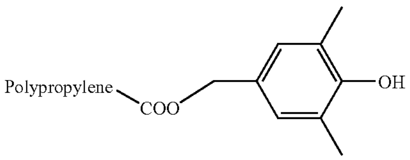
-continued
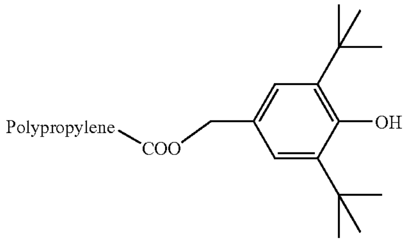
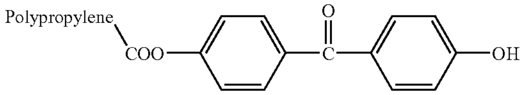
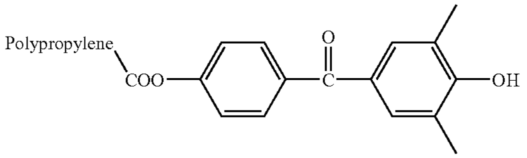
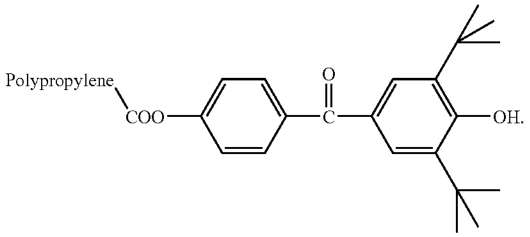
5. The nanocomposite of claim 1, wherein the heat aged failure of a molded sample of said nanocomposite is at least 10% higher than a reference nanocomposite comprising the same elements except that the thermoplastic polyolefin is substantially free of stabilization functionality.
* * * * *